US010952113B2

(12) United States Patent
Mahkonen et al.

(10) Patent No.: US 10,952,113 B2
(45) Date of Patent: Mar. 16, 2021

(54) PLANNED CONTINUITY OF UNMANNED AERIAL VEHICLE (UAV) LINK CONNECTIVITY IN UAV TRAFFIC MANAGEMENT SYSTEMS

(71) Applicants: Telefonaktiebolaget LM Ericsson (publ), Stockholm (SE); Heikki Mahkonen, San Jose, CA (US)

(72) Inventors: Heikki Mahkonen, San Jose, CA (US); Ravi Manghirmalani, Fremont, CA (US); Attila Takács, San Jose, CA (US)

(73) Assignee: Telefonaktiebolaget LM Ericsson (publ)

( * ) Notice: Subject to any disclaimer, the term of this patent is extended or adjusted under 35 U.S.C. 154(b) by 0 days.

(21) Appl. No.: 16/644,450

(22) PCT Filed: Sep. 5, 2017

(86) PCT No.: PCT/US2017/050046
§ 371 (c)(1),
(2) Date: Mar. 4, 2020

(87) PCT Pub. No.: WO2019/050500
PCT Pub. Date: Mar. 14, 2019

(65) Prior Publication Data
US 2020/0236602 A1    Jul. 23, 2020

(51) Int. Cl.
*H04W 36/08*    (2009.01)
*H04W 76/25*    (2018.01)
(Continued)

(52) U.S. Cl.
CPC ........ *H04W 36/08* (2013.01); *H04B 7/18506* (2013.01); *H04W 36/00835* (2018.08);
(Continued)

(58) Field of Classification Search
CPC ................. H04W 38/08; H04W 76/25; H04W 36/00835; H04W 36/023; H04W 36/30;
(Continued)

(56) References Cited

U.S. PATENT DOCUMENTS 9,363,690 B1    6/2016    Singh et al.
9,412,278 B1    8/2016    Gong et al.
(Continued)

FOREIGN PATENT DOCUMENTS

CN    101836478 A    9/2010
CN    104053195 A    9/2014
(Continued)

OTHER PUBLICATIONS

3GPP TS 23.203 V12.6.0, 3rd Generation Partnership Project, Technical Specification Group Services and System Aspects, Policy and charging control architecture, (Release 12), Sep. 2014, 220 pages.
(Continued)

*Primary Examiner* — Barry W Taylor
(74) *Attorney, Agent, or Firm* — Nicholson De Vos Webster & Elliott LLP

(57) ABSTRACT

A method for managing a wireless connection of an Unmanned Aerial Vehicle (UAV) is described herein. The method may include detecting a handover condition for the UAV within a wireless network, wherein the UAV is connected to a source cell in the wireless network when the handover condition is detected; determining, in response to detecting the handover condition, a target cell in the wireless network based on a flight path of the UAV; and initiating a handover of the UAV from the source cell to the target cell.

17 Claims, 15 Drawing Sheets

(51) Int. Cl.
*H04W 36/00* (2009.01)
*H04B 7/185* (2006.01)
*H04W 36/02* (2009.01)
*H04W 36/30* (2009.01)
*H04W 36/32* (2009.01)
*H04W 84/04* (2009.01)

(52) U.S. Cl.
CPC ......... *H04W 36/023* (2013.01); *H04W 36/30* (2013.01); *H04W 36/32* (2013.01); *H04W 76/25* (2018.02); *H04W 84/042* (2013.01)

(58) Field of Classification Search
CPC .................. H04W 36/32; H04W 84/02; B64C 2201/141; G08G 5/0069
See application file for complete search history.

(56) References Cited

U.S. PATENT DOCUMENTS

| | | | |
|---|---|---|---|
| 9,467,922 B1 | 10/2016 | Buchmueller et al. | |
| 9,537,561 B1* | 1/2017 | Kotecha | H04W 8/00 |
| 9,588,516 B1 | 3/2017 | Gurel et al. | |
| 9,609,288 B1 | 3/2017 | Richman et al. | |
| 9,709,409 B2 | 7/2017 | Dave et al. | |
| 2004/0156399 A1* | 8/2004 | Eran | H04W 48/20 370/395.5 |
| 2007/0284474 A1 | 12/2007 | Olson et al. | |
| 2010/0062774 A1* | 3/2010 | Motegi | H04W 36/02 455/437 |
| 2010/0085236 A1 | 4/2010 | Franceschini et al. | |
| 2010/0153001 A1 | 6/2010 | Bauchot et al. | |
| 2012/0225675 A1 | 9/2012 | Nishida et al. | |
| 2015/0038140 A1 | 2/2015 | Kilpatrick et al. | |
| 2015/0119043 A1 | 4/2015 | Gopal et al. | |
| 2015/0208300 A1 | 7/2015 | McLaughlin et al. | |
| 2015/0312813 A1* | 10/2015 | Xu | H04W 36/0058 455/438 |
| 2016/0065345 A1 | 3/2016 | Kim et al. | |
| 2016/0070265 A1 | 3/2016 | Liu et al. | |
| 2016/0125740 A1 | 5/2016 | Pasko et al. | |
| 2016/0140851 A1 | 5/2016 | Levy et al. | |
| 2016/0142944 A1* | 5/2016 | Cao | H04W 36/0022 455/436 |
| 2016/0161258 A1 | 6/2016 | Magson et al. | |
| 2016/0284221 A1 | 9/2016 | Hinkle et al. | |
| 2016/0292403 A1 | 10/2016 | Gong et al. | |
| 2016/0300493 A1 | 10/2016 | Ubhi et al. | |
| 2016/0300495 A1 | 10/2016 | Kantor et al. | |
| 2016/0358187 A1 | 12/2016 | Radocchia et al. | |
| 2016/0363929 A1 | 12/2016 | Clark et al. | |
| 2016/0371985 A1 | 12/2016 | Kotecha | |
| 2016/0371987 A1 | 12/2016 | Kotecha | |
| 2016/0380692 A1 | 12/2016 | Jalali et al. | |
| 2017/0045884 A1 | 2/2017 | Kablaoui | |
| 2017/0092137 A1 | 3/2017 | Hiebl | |
| 2017/0124884 A1 | 5/2017 | Shaw et al. | |
| 2017/0142766 A1* | 5/2017 | Kim | H04W 48/20 |
| 2017/0150373 A1 | 5/2017 | Brennan et al. | |
| 2017/0168480 A1 | 6/2017 | Wanstedt et al. | |
| 2018/0152510 A1* | 5/2018 | Newton | H04L 61/1535 |
| 2018/0247544 A1 | 8/2018 | Mustafic et al. | |
| 2018/0279348 A1 | 9/2018 | Huang et al. | |
| 2019/0012923 A1 | 1/2019 | Weisbrod et al. | |
| 2019/0289505 A1* | 9/2019 | Thomas | H04W 36/08 |
| 2019/0364492 A1* | 11/2019 | Azizi | H04W 48/10 |

FOREIGN PATENT DOCUMENTS

| | | | |
|---|---|---|---|
| EP | 2175290 A1 | 4/2010 | |
| EP | 2175290 B1 | 10/2013 | |
| EP | 3029996 A1 | 6/2016 | |
| EP | 3349085 A1 | 7/2018 | |
| JP | 2003-092545 A | 3/2003 | |
| RU | 2595642 C1 | 8/2016 | |
| RU | 2637838 C2 | 12/2017 | |
| WO | 2011/100535 A1 | 8/2011 | |
| WO | 2012/112097 A1 | 8/2012 | |
| WO | 2015/114572 A1 | 8/2015 | |
| WO | 2015/179439 A1 | 11/2015 | |
| WO | 2016/154949 A1 | 10/2016 | |
| WO | 2016/161637 A1 | 10/2016 | |
| WO | 2016/164892 A1 | 10/2016 | |
| WO | 2016/190793 A1 | 12/2016 | |
| WO | 2017/042403 A1 | 3/2017 | |
| WO | 2017/048363 A1 | 3/2017 | |
| WO | 2017/149160 A1 | 9/2017 | |

OTHER PUBLICATIONS

3GPP TS 23.203 V14.2.0, 3rd Generation Partnership Project, Technical Specification Group Services and System Aspects, Policy and charging control architecture, (Release 14), Dec. 2016, 256 pages.
3GPP TS 23.271 V14.0.0, 3rd Generation Partnership Project, Technical Specification Group Services and System Aspects, Functional stage 2 description of Location Services (LCS), (Release 14), Dec. 2016, 180 pages.
3GPP TS 23.401 V14.2.0, 3rd Generation Partnership Project, Technical Specification Group Services and System Aspects, General Packet Radio Service (GPRS) enhancements for Evolved Universal Terrestrial Radio Access Network (E-UTRAN) access, (Release 14), Dec. 2016, 385 pages.
3GPP TS 36.201 V14.0.0, 3rd Generation Partnership Project, Technical Specification Group Radio Access Network, Evolved Universal Terrestrial Radio Access (E-UTRA) LTE physical layer; General description, (Release 14), Sep. 2016, 15 pages.
3GPP TS 36.300 V14.1.0, 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, (Release 14), Dec. 2016, 317 pages.
3GPP TS 45.002 V14.0.0, 3rd Generation Partnership Project, Technical Specification Group Radio Access Network, GSM/EDGE Multiplexing and multiple access on the radio path, (Release 14), Dec. 2016, 142 pages.
Federal Aviation Administration, Automatic Dependent Surveillance-Broadcast (ADS-B), 2019, 2 pages.
Forsberg, Providing Air Traffic Control Services for Small Unmanned Aircraft Through LTE, https://www.diva-portal.org/smash/get/diva2:1041494/FULLTEXT01.pdf, 2016, 90 pages.
GPS World, "uAvionix demonstrates dime-sized ADS-B for high-traffic drone operations", available online at <http://gpsworld.com/uavionix-demonstrates-dime-sized-ads-b-for-high-traffic-drone-operations>, retrieved on Apr. 4, 2017, 6 pages.
Guterres et al., "ADS-B Surveillance System Performance with Small UAS at Low Altitudes", available online at <https://www.mitre.org/sites/default/files/publications/16-4497-AIAA-2017-ADS-B.pdf>, 2017, 15 pages.
Huawei et al., "Mobility enhancement for Drones", 3GPP TSG-RAN WG2 Meeting #98, R2-1704997, 3rd Generation Partnership Project (3GPP), Hangzhou, China, May 14, 2017 (May 14, 2017), XP051275500, Retrieved from the Internet: URL:http://www.3gpp.org/ftp/Meetings_3GPP_SYNC/RAN2/Docs/.
Huawei et al., "Potential enhancements for drones", 3GPP TSG-RAN WG1 Meeting #89, R1-1707016, 3rd Generation Partnership Project (3GPP), Hangzhou, China, May 14, 2017 (May 14, 2017), XP051272246, Retrieved from the Internet: URL:http://www.3gpp.org/ftp/Meetings_3GPP_SYNC/RAN1/Docs/.
IEEE Std 802.11 (Trademark)—2012, Part 11: Wireless LAN Medium Access Control (MAC) and Physical Layer (PHY) Specifications, Mar. 2012, 2793 pages.
International Preliminary Report on Patentability, PCT App. No. PCT/IB2017/053444, dated Oct. 10, 2019, 9 pages.
International Preliminary Report on Patentability, PCT App. No. PCT/IB2017/053477, dated Oct. 10, 2019, 8 pages.
International Preliminary Report on Patentability, PCT App. No. PCT/IB2017/053641, dated Oct. 10, 2019, 8 pages.

(56) References Cited

OTHER PUBLICATIONS

International Preliminary Report on Patentability, PCT App. No. PCT/IB2017/054160, dated Oct. 16, 2019, 21 pages.
International Preliminary Report on Patentability, PCT App. No. PCT/IB2017/054252, dated Oct. 24, 2019, 8 pages.
International Preliminary Report on Patentability, PCT App. No. PCT/IB2017/057810, dated May 9, 2019, 13 pages.
International Preliminary Report on Patentability, PCT App. No. PCT/IB2017/057859, dated Oct. 10, 2019, 15 pages.
International Preliminary Report on Patentability, PCT App. No. PCT/IB2017/057860, dated Oct. 10, 2019, 14 pages.
International Search Report and Written Opinion for Application No. PCT/IB2017/053477, dated Dec. 15, 2017, 11 pages.
International Search Report and Written Opinion for Application No. PCT/IB2017/053641, dated Nov. 22, 2017, 11 pages.
International Search Report and Written Opinion for Application No. PCT/IB2017/054160, dated Mar. 13, 2018, 16 pages.
International Search Report and Written Opinion for Application No. PCT/IB2017/054252, dated Jan. 3, 2018, 11 pages.
International Search Report and Written Opinion for Application No. PCT/IB2017/057810, dated Mar. 13, 2018, 10 pages.
International Search Report and Written Opinion for Application No. PCT/IB2017/057859, dated Jun. 12, 2018, 21 pages.
International Search Report and Written Opinion for Application No. PCT/IB2017/057860, dated Jun. 12, 2018, 20 pages.
International Search Report and Written Opinion, PCT App. No. PCT/IB2017/053444, dated Dec. 21, 2017, 13 pages.
International Search Report and Written Opinion, PCT App. No. PCT/IB2017/058525, dated Jul. 30, 2018, 14 pages.
International Search Report and Written Opinion, PCT App. No. PCT/IB2018/052238, dated Dec. 13, 2018, 12 pages.
International Search Report and Written Opinion, PCT App. No. PCT/IB2018/052239, dated Nov. 29, 2018, 13 pages.
Latas, "The Drone Safety Platform", available online at <http://www.flylatas.com/>, retrieved on Mar. 31, 2017, 7 pages.
LG Electronics Inc., "Aerial Traffic Handling using Positioning Identification", 3GPP TSG-RAN WG2 Meeting #98, *2-1705660, 3rd Generation Partnership Project (3GPP), Hangzhou, China, May 14, 2017 (May 14, 2017), KP051275974, Retrieved from the Internet: URL:http://www.3gpp.org/ftp/Meetings 3GPPSYNC/RAN2/Docs/.
MAVLINK Common Message set specifications, available online at <http://mavlink.org/messages/common>, retrieved on Jan. 31, 2017, 98 pages.
Office Action, TW App. No. 107115169, dated Apr. 22, 2019, 9 pages (2 pages of Partial English Translation and 7 pages of Original Document).
Office Action, TW App. No. 107115169, dated Nov. 28, 2018, 17 pages (8 pages of English Translation and 9 pages of Original Document).
Opensignal, "Opensignal combines real-world measurements with scientific analysis to provide independent insights on mobile connectivity globally", available online at <https://www.opensignal.com/>, 2020, 4 pages, Dec. 2020.
Orefice, "ADS-B Based Sense and Avoid Applications for General Aviation/Unmanned Aircraft", available online at <http://www.fedoa.unina.it/10305/1/orefice_martina_27.pdf>, 2015, 114 pages, Dec. 2015.
Qualcomm, LTE Unmanned Aircraft Systems, Qualcomm Technologies, Inc., Trial Report, v1.0.1, May 12, 2017, 65 pages.
R1-1705823, 3GPP TSG-RAN WG1 Meeting 88bis, Spokane, KDDI Corporation, Field measurement results for drone LTE enhancement, USA, Apr. 3-7, 2017, 6 pages.
Radio Control, Beginners' Guide, available online at <https://rcplanes.online/guide1.htm>, May 8, 2019, 9 pages.
Ruano et al., "Augmented Reality Tool for the Situational Awareness Improvement of UAV Operators", Sensors, vol. 17, 2017, 16 pages.
Second Written Opinion for Application No. PCT/IB2017/054160, dated Jun. 7, 2019, 15 pages.
SUR.ET1.ST05.2000-STD-12-01, Eurocontrol Standard Document for Surveillance Data Exchange, Part 12: Category 021, ADS-B Reports, Dec. 2010, 72 pages.
UAS Identification and Tracking (UAS ID) Aviation Rulemaking Committee (ARC), ARC Recommendations Final Report, Sep. 30, 2017, 213 pages.
UAvionix, "ADS-B Transceivers, Receivers and Navigation Systems for Drones", available online at <http://www.unmannedsystemstechnology.com/company/uavionix-corporation>, retrieved on Apr. 4, 2017, 10 pages.
Unmanned Aircraft System (UAS) Traffic Management (UTM), available online at <https://utm.arc.nasa.gov/index.shtml>, retrieved on Apr. 4, 2017, 2 pages.
Wikipedia, "Blockchain", available online at <https://en.wikipedia.org/w/index.php?title=Blockchain&oldid=901056350>, retrieved on Jun. 9, 2019, 20 pages.
International Search Report and Written Opinion for Application No. PCT/US2017/050046, dated Dec. 13, 2017, 13 pages.
Curran et al., "Location Based Predictive Handoff Algorithm for Mobile Networks," Advances in Intelligent IT: Active Media Technology, May 2006, pp. 86-91.
Kapellaki et al., "The "Le" interface: performance evaluation of 2-tier and 3-tier 3GPP compliant realizations," IEEE International Conference on Communications, ICC 2005, vol. 3, No. 16, 2005, pp. 1423-1427.
Wikipedia, "Global Positioning System", available online at <https://en.wikipedia.org/w/index.php?title=Global_Positioning_System&oldid=917890871>, Sep. 26, 2019, 36 pages.

\* cited by examiner

PLANNED CONTINUITY OF UNMANNED AERIAL VEHICLE (UAV) LINK CONNECTIVITY IN UAV TRAFFIC MANAGEMENT SYSTEMS

CROSS-REFERENCE TO RELATED APPLICATIONS

This application is a National stage of International Application No. PCT/US2017/050046, filed Sep. 5, 2017, which is hereby incorporated by reference.

FIELD

Embodiments of the invention relate to the field of managing Unmanned Aerial Vehicles (UAVs); and more specifically, to managing handovers of UAVs between cells in a wireless network using a flight plan provided by a UAV Traffic Management (UTM) system.

BACKGROUND

The Federal Aviation Administration (FAA) and National Aeronautics and Space Administration (NASA) are defining an Unmanned Aerial Vehicle (UAV) Traffic Management (UTM) framework/system. Such a system seeks to present an effective management structure for UAV traffic. In this vein, the UTM is sought to act as an enabler to promote widespread use of UAVs in both commercial and recreational settings while at the same time minimizing the perils to manned air traffic and surrounding pieces of infrastructure. The UTM system is designed to work autonomously, with no active human air traffic controller constantly supervising and monitoring the airspace.

Besides enforcing constraints and directives from the FAA and other regulatory/governmental agencies, the UTM can provide supplemental data services to UAV operators. Such services could include terrain information, weather information, communication coverage, spatial occupancy of other UAVs, surveillance information of a mission area, or performance information of specific aircraft. The UTM also allows private and public entities to provide constraints, notifications, and other necessary information to carry out UAV missions in a safe manner. A UAV Service Supplier (USS) in the UTM architecture is the entity that collects all required information from other entities or connects information consumers with their providers upon request.

A UTM system will commonly be used for the planning, scheduling and execution of a UAV mission. When a UAV operator is planning for a UAV mission (e.g., a package delivery mission), the UAV operator will post the planned mission request to the USS. The USS will check that the planned mission is allowed by a Flight Information Management System (FIMS) and, if permitted and with no scheduling conflicts, the UAV operator will eventually be granted a "go ahead" to carry out the mission. At this stage, the USS could send all relevant information, including the flight path, to the UAV operator. Once the mission is in progress, the USS can issue fresh notifications to the UAV operator if any mission conditions change during the allocated time slot of the mission (e.g., fresh new constraints are issued, weather emergencies arise or the airspace becomes congested).

To maintain safe operations of a UAV, command and control (C2) link connectivity is paramount. A UAV operator issues commands to a UAV over this channel to maintain control of the UAV to carry out the mission. If this C2 link fails to consistently provide connectivity and access to the UAV, the mission success and safety is in jeopardy.

SUMMARY

A method for managing a wireless connection of an Unmanned Aerial Vehicle (UAV) is described herein. The method may include detecting a handover condition for the UAV within a wireless network, wherein the UAV is connected to a source cell in the wireless network when the handover condition is detected; determining, in response to detecting the handover condition, a target cell in the wireless network based on a flight path of the UAV; and initiating a handover of the UAV from the source cell to the target cell.

The method described above enables optimal network utilization during out of coverage handovers. Specifically, when the UAV moves out of the coverage areas of network cells and consequently detaches from the network, Internet Protocol-Connectivity Access Network (IP-CAN) session state information associated with the UAV may be preserved and later utilized. In particular, since the movement pattern (e.g., flight path) of the UAV is known in advance, the network can predict when and where the UAV will reattach to the network and utilize this IP-CAN session state information for the target cell. In addition, this functionality enables automated alarms if the UAV is missing after a time that the UAV is predicted (based on a known flight path) to have connected with the target cell. Using the techniques described herein (particularly for the multiple target cells over the course of the same flight path or different flight paths), the network can learn how handovers are executed and use this learned information to further optimize out of coverage handovers for UAVs. Further, by caching data and/or spoofing messages on behalf of the UAV, legacy UAV management protocols may function normally even when the UAV is out of coverage.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
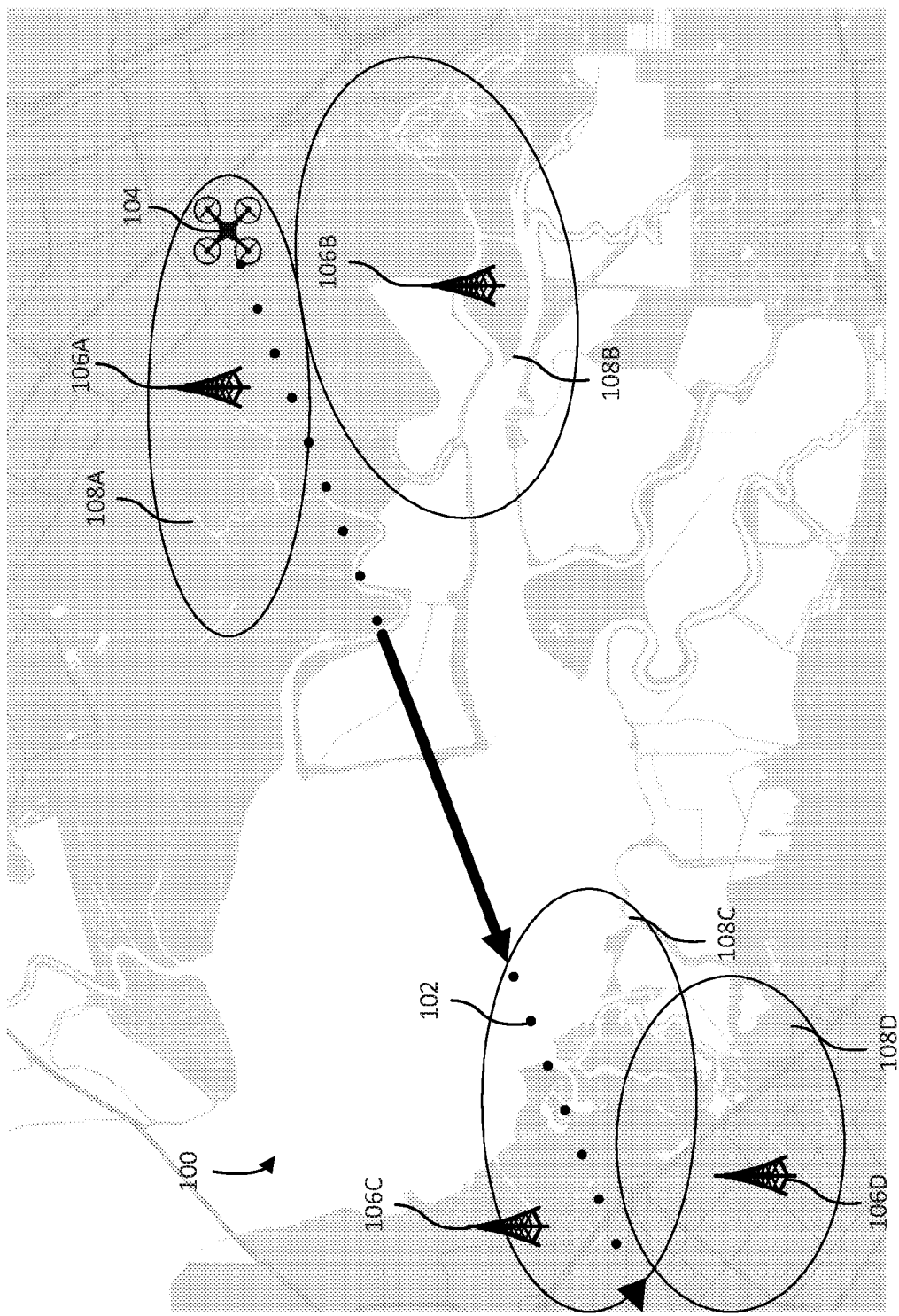
FIG. 1 illustrates a flight path of an Unmanned Aerial Vehicle (UAV) in which the UAV is currently within a wireless coverage area of a cell of a wireless network.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A system according to one embodiment is presented herein that utilizes Unmanned Aerial Vehicle (UAV) flight path information to optimize connectivity in a wireless network. FIG. 1 shows a flight path 102 of the UAV 104, which traverses a wireless network. In one embodiment, the flight path 102 may be retrieved by components of the wireless network 100 from a UAV Traffic Management (UTM) system. In some embodiments, the UAV 104 may gain access to resources of the wireless network via one or more of the cells 106A, 106B, 106C and 106D that provide access to user equipment (UE), including the UAV 104. For example, as shown in FIG. 1, the UAV 104 is within the wireless coverage area 108A of the cell 106A. While in the wireless coverage area 108A, the UAV 104 can communicate with the cell 106A and consequently access resources of the wireless network 100 via the cell 106A. These resources may include connectivity with a UAV operator of the UAV 104 such that the UAV operator may command/control the UAV 104 (e.g., using a command and control (C2) link) and/or access data provided by the UAV 104 (e.g., using telemetry and/or audio/video links). Although the UAV 104 is using the cell 106A to obtain access to the wireless network 100, the UAV 104 may gain access to the wireless network 100 using any of the cells 106A-106D once the UAV 104 is within a corresponding coverage area 108A-108D.

Figure 2:
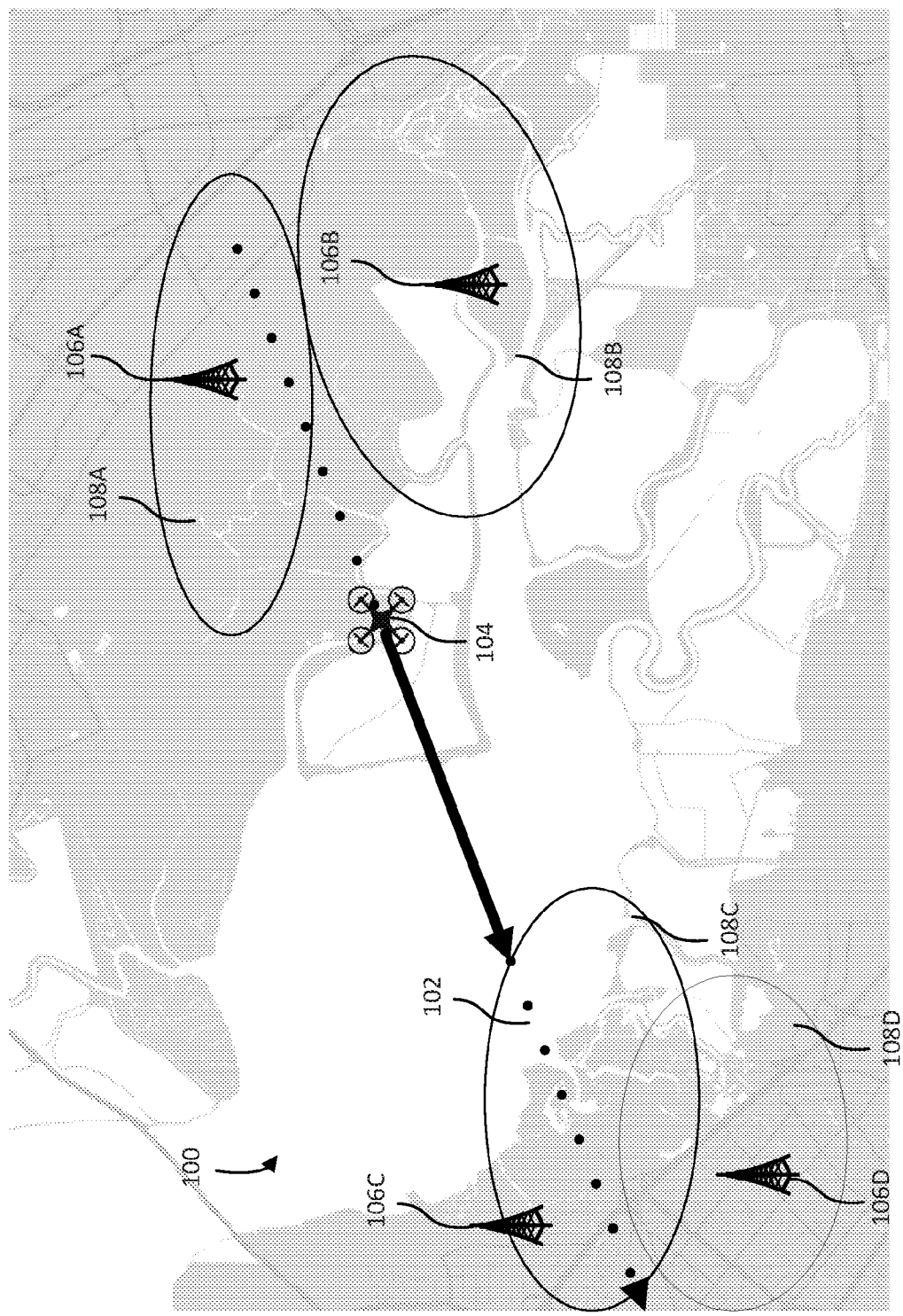
FIG. 2 illustrates a flight path of the UAV in which the UAV is now outside of the coverage area of all cells in the wireless network.

As shown in FIG. 2, moving along the flight path 102, the UAV 104 will eventually move outside the coverage areas 108A-108D of the cells 106A-106D, respectively, and will temporarily be disconnected from the wireless network 100. In some embodiments, upon detecting that the UAV 104 will imminently and temporarily move outside the coverage areas 108A-108D, the wireless network 100 may initiate a handover procedure. Detecting that the UAV 104 will imminently and temporarily be moving outside the coverage areas 108A-108D may be performed by analyzing the flight path 102 of the UAV 104 in conjunction with location information of the UAV 104, which describes the current geographical location of the UAV 104. In one embodiment, the wireless network 100 is a 3rd Generation Partnership Project (3GPP) network. In this embodiment, a Mobility Management Entity (MME) or an enhanced NodeB (eNodeB) (e.g., the cell 106A) may determine that the UAV 104 will soon exit the coverage areas 108A-108D based on location information of the UAV 104 provided by Location Services (LCS) together with the flight path 102 and may initiate the handover procedure based on this determination.

A handover procedure is defined as the process of transferring a data session or link of user equipment (UE) (e.g., the UAV 104) from a source cell 106A-106D in the wireless network 100 to a target cell 106A-106D in the wireless network 100. Accordingly, although the UAV 104 is moving between cells 106A-106D, the UAV 104 is staying within the wireless network 100. This transfer allows the UAV 104 to move through different coverage areas 108A-108D while maintaining access to the wireless network. In one embodiment, the handover procedure may include the transfer of a current state of a wireless connection from the source cell 106A-106D to the target cell 106A-106D. In some embodiments, handover may be interchangeably referred to as a handoff and the handover procedure may be referred to as a delayed handover procedure or enhanced handover procedure.

In some embodiments, in which the UAV 104 is able to directly move between coverage areas 108A-108D, the handover procedure may never cause the UAV 104 to disconnect/detach from the wireless network 100. However, in some embodiments the UAV 104 is forced, based on an approved flight path, to move outside the coverage areas 108A-108D before later returning to one of the coverage areas 108A-108D. For example, as shown in FIG. 1 and FIG. 2, the flight path of the UAV 104 causes the UAV 104 to move outside the coverage area 108A and consequently is then out of all the coverage areas 108A-108D until entering coverage area 108C a short time later. In these embodiments, the UAV 104 may temporarily disconnect from the wireless network 100. In the example of FIG. 1 and FIG. 2, this disconnection would last until the UAV 104 enters the coverage area 108C of the cell 106C. Since the wireless network 100 has access to the flight path of the UAV 104 via a corresponding UTM, the handover procedure may attempt to make reconnection to the wireless network 100 as seamless as possible by identifying a target cell 106A-106D and performing operations to minimize effects to ongoing sessions/links. For example, in some embodiments, the handover procedure may identify a target cell 106A-106D prior to the UAV 104 temporarily disconnecting from the wireless network 100 and set a timer for reconnection. Both the target cell 106A-106D and the reconnection timer may be selected/set based on the flight path 102 of the UAV 104. For example, in the example shown in FIG. 1 and FIG. 2, as the UAV 104 moves to the edge of the coverage area 108A, the handover procedure may be initiated to select the cell 106C as the target cell and a reconnection timer may be set to account for the amount of time between flying outside the coverage area 108A of the source cell 106C and entering the coverage area 108C of the target cell 106C. During the period of the timer, the handover procedure may perform a set of operations to ensure that ongoing links/sessions of the UAV 104 are not lost. In some embodiments, these operations may include spoofing messages on behalf of the UAV 104 (e.g., transmitting "hello" or keep alive messages on behalf of the UAV 104 to associated services) and/or caching data to be received by the UAV 104 once the UAV 104 reconnects to the wireless network via the target cell 106A-106D. If the UAV 104 fails to reconnect to the wireless network before expiration of the timer, a component of the wireless network (e.g., the MME) may report to the UTM and/or the UAV operator that connection to the UAV 104 has been lost. This may inform the UTM that the UAV 104 is performing an emergency procedure (e.g., emergency landing and/or return home).

In many cases, handover procedures are designed for mobile phones for which their geographical path within an area covered by a wireless network would be difficult or impossible to predict. For example, once a mobile phone has moved outside the coverage of a wireless network, it may be impossible to predict where this nomadic device will reattach as the wireless network has no information regarding the intended/expected path of the mobile phone. Therefore, end-to-end connectivity, including any active links/sessions, would typically be lost once the mobile phone has detached from the network. However, through the use of flight paths received from a trusted source, such as a UTM, handover procedures described herein may preserve end-to-end connectivity. In particular, as briefly mentioned above and described in greater detail below, the handover procedures described herein pre-select target cells, spoof communications and cache data on behalf of the UAV 104 for a predicted/estimated period of time. The handover procedures described herein may be particularly useful for UAVs 104 performing automated missions as their approved flight paths will likely be strictly adhered.

Although described in relation to 3GPP protocols, the systems and methods described herein should not be construed as limited to 3GPP protocols or cellular networks. In other embodiments, other cellular and wireless network protocols may be used. Further, although described in relation to obtaining location information from network provided location services/systems (e.g., 3GPP Location Services (LCS)), in other embodiments other location services/systems may be used (e.g., the Global Positioning System (GPS)).

Figure 3:
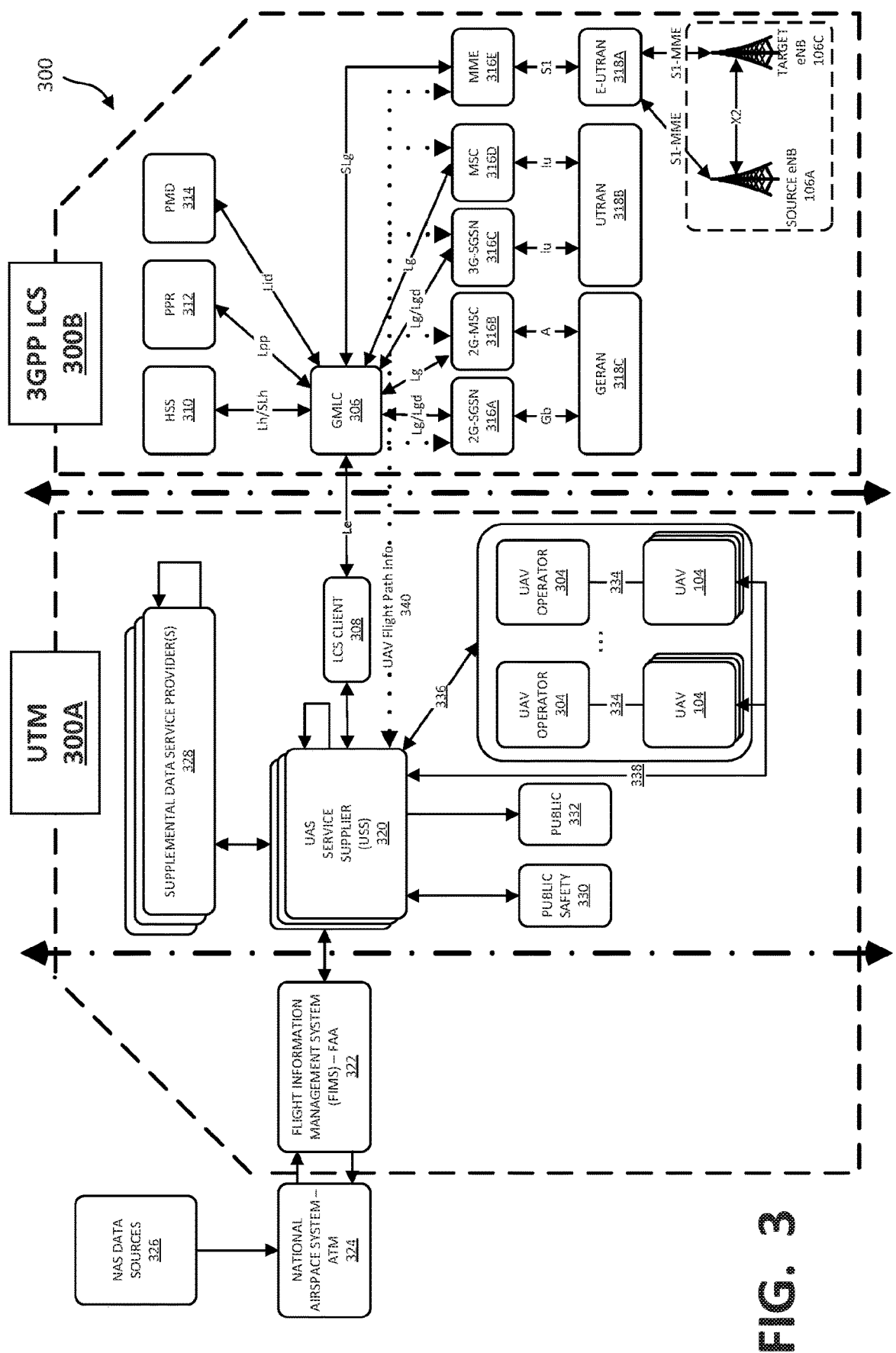
FIG. 3 illustrates an air traffic system, including a UAV Traffic Management (UTM) system and a 3GPP Location Services (LCS) system, according to one embodiment.

FIG. 3 shows an air traffic system 300 for managing a flight plan of a UAV 104, according to one embodiment. The air traffic system 300 may be used for managing the flights of one or more UAVs 104 that are controlled/operated/piloted by corresponding UAV operators 304. The UAVs 104 may be interchangeably referred to as Unmanned Aircraft Systems (UASs) or drones throughout this description. The air traffic system 300 may be divided into two logical portions: an UAV Traffic Management (UTM) system 300A and a 3GPP Location Services (LCS) system 300B. In this configuration, the UTM system 300A provides flight path information to the 3GPP LCS system 300B and the 3GPP LCS system 300B provides location services to the UTM system 300A.

The 3GPP LCS system 300B provides location information of the UAVs 104 based on wireless communications of the UAVs 104 in the wireless network 100. For instance, the 3GPP LCS system 300B may determine the location information of a particular UAV 104 based on radio signal measurements of the UAV 104 and estimating the location of the UAV 104 based on those radio signal measurements (e.g., triangulation of the radio signal measurements). Thus, the 3GPP LCS system 300B provides network determined location information of the UAVs 104, as opposed to location information being reported by the UAVs 104 themselves. However, as noted above, in other embodiments, location information of the UAVs 104 may be provided through other systems, including GPS.

In some embodiments, the UAVs 104 may be small or miniature UAVs, which are unmanned aircraft that are small enough to be considered portable by an average man and typically operate/cruise at altitudes lower than larger aircraft. For example, a small UAV may be any unmanned aircraft that is fifty-five pounds or lighter and/or is designed to operate below 400 feet. Although the embodiments described herein may be applied to small UAVs, the systems and methods are not restricted to aircraft of these sizes or that are designed to operate at particular altitudes. Instead, the methods and systems described herein may be similarly applied to aircraft of any size or design and with or without an onboard pilot/operator. For example, in some embodiments, the methods and systems described herein may be used for UAVs 104 larger than fifty-five pounds and/or UAVs 104 that are designed to fly above 400 feet.

The UAVs 104 are aircraft without an onboard human controller. Instead, the UAVs 104 may be operated/piloted using various degrees of autonomy. For example, a UAV 104 may be operated by a human (e.g., the UAV operator 304) located on the ground or otherwise removed and independent of the location of the UAV 104. For example, a UAV operator 304 may be located on the ground and acts to directly control each movement of a UAV 104 or a group of UAVs 104 through a radio control interface (e.g., a command and control (C2) interface). In this embodiment, the UAV operator 304 may transmit commands via the radio interface to cause the UAV 104 to adjust/move particular flight instruments (e.g., flaps, blades, motors, etc.) for the purpose of following a flight plan or another set of objectives. In other scenarios, the UAV operator 304 may provide a flight plan to the UAV 104. In response to the flight plan, the UAV 104 may adjust/move particular flight instruments to fulfill objectives of the flight plan. In these embodiments, a human operator may monitor the progress of the flight plan and intervene as needed or as directed. In some embodiments, the UAV operator 304 may be viewed as the remote human controller, a remote digital controller, an onboard digital controller, or a combination of the preceding.

Figure 4:
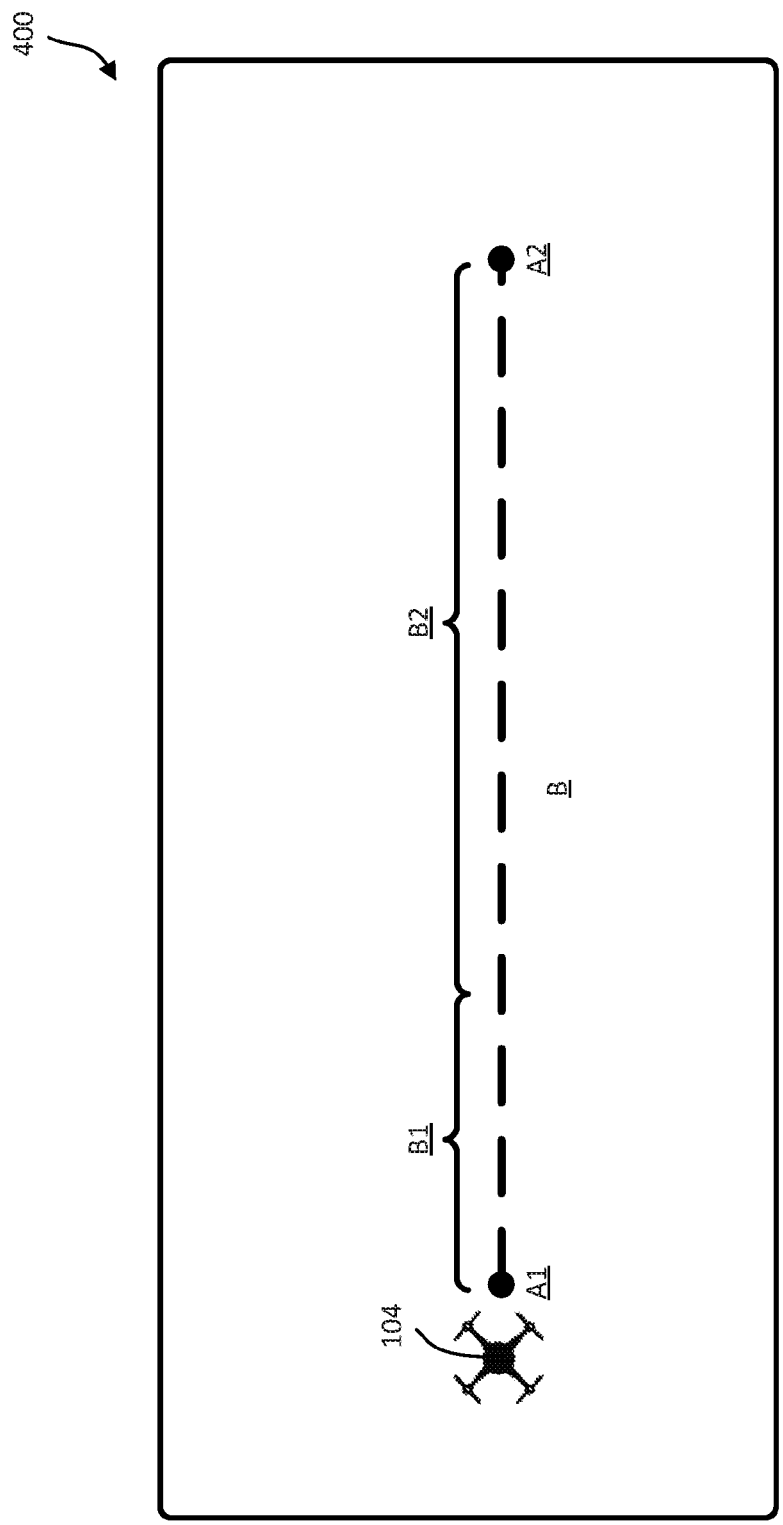
FIG. 4 illustrates an example flight plan with a set of coordinates according to one embodiment.

A flight plan may include one or more points of a path (e.g., a starting point, an ending point, and/or a set of waypoints, where each are defined by longitudinal and latitudinal coordinates), a set of velocities, a set of altitudes, a set of headings/directions, a set of events (e.g., capture video at prescribed times or locations, hover over an area for a specified interval, etc.), a time/expiration/duration, and a set of restricted zones/areas. For instance, the flight plan 400 shown in FIG. 4 indicates that the UAV 104 is to take off from location A1 (corresponding to a first set of longitude and latitude coordinates) and travel to location A2 (corresponding to a second set of longitude and latitude coordinates) using the path B. The path B may be separated into the segments B1 and B2. In this scenario, the UAV 104 is restricted to an altitude between 300 feet and 400 feet and a velocity of 100 miles/hour during segment B1 and an altitude between 350 feet and 400 feet and a velocity of 90 miles/hour during segment B2. The above altitude and velocity limitations are merely exemplary and in other embodiments higher altitude and velocity limitations may be assigned/issued for a UAV 104 (e.g., altitude limitations above 400 feet and velocity limitations above 100 miles/ hour).

Figure 5:
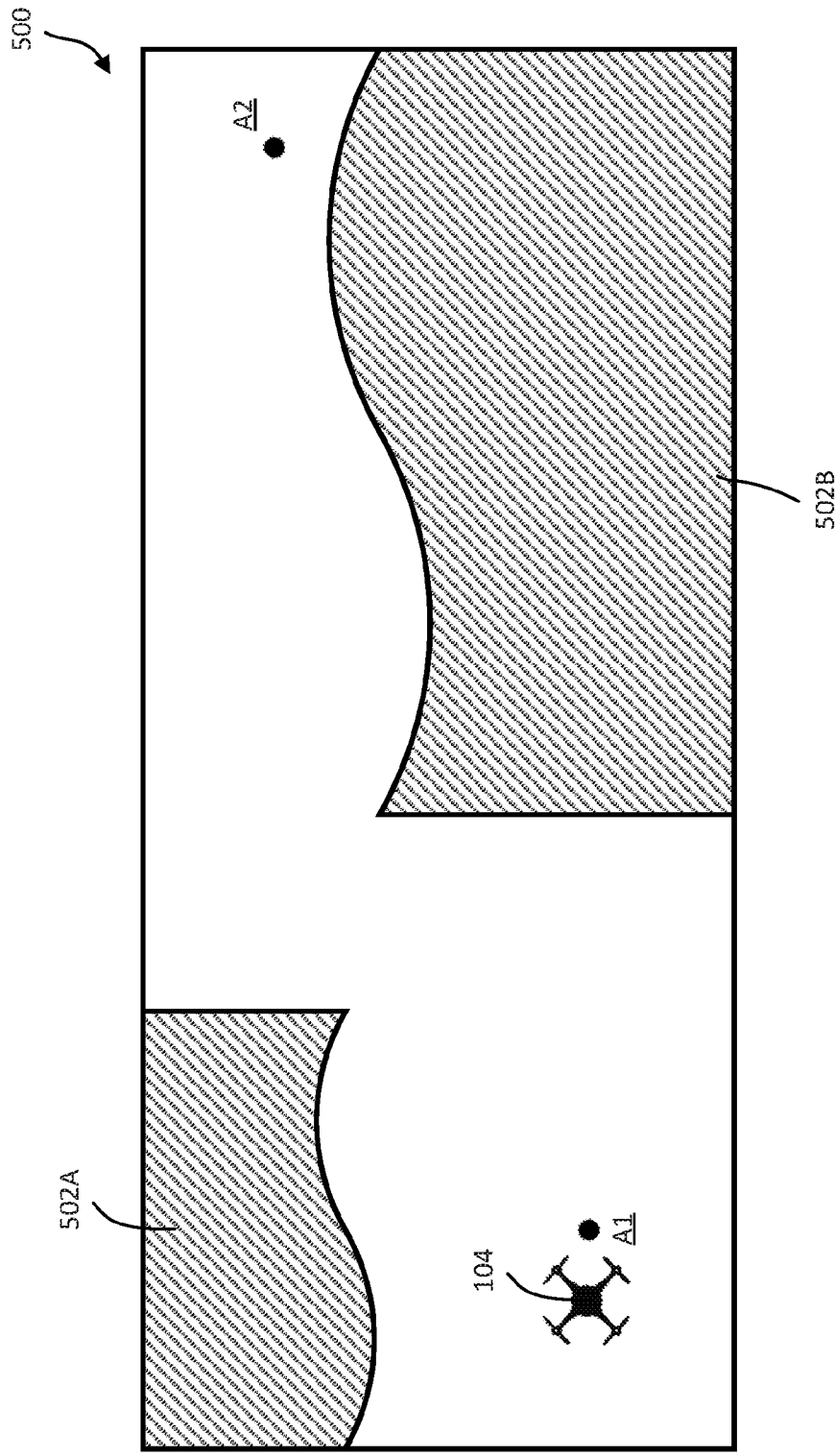
FIG. 5 illustrates an example flight plan with a set of restricted areas/zones according to one embodiment.

In another example, as shown in FIG. 5, a flight plan 500 may indicate that the UAV 104 is to take off from location A1, travel to location A2, and avoid a set of restricted zones 502A and 502B. In this example, the UAV 104 is directed to reach the target location A2 without entering the set of restricted zones 502A and 502B. The restricted zones may be relative to geographical location (defined by a set of coordinates), an altitude, and/or a velocity. For example, the UAV 104 may be permitted to enter restricted zone 502A but only at a prescribed altitude and/or only at a prescribed velocity.

Figure 6:
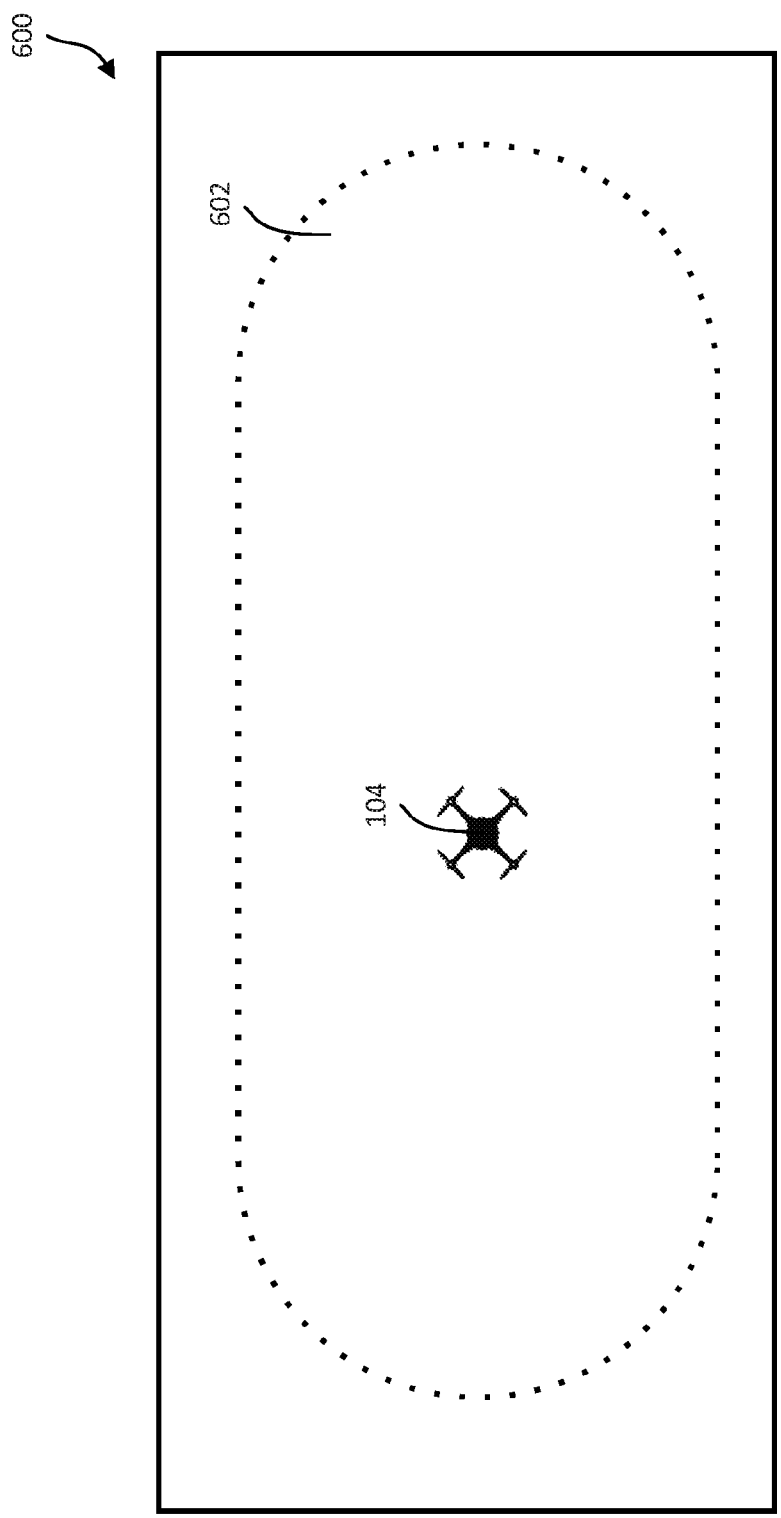
FIG. 6 illustrates an example flight plan with a designated clearance zone according to one embodiment.

In still another example, shown in FIG. 6, a flight plan 600 may provide clearance for the UAV 104 to fly in a designated clearance zone 602. The clearance zone 602 may be a confined area associated with an altitude range (e.g., between 400-500 feet) and/or an expiration/duration (e.g., an expiration of 11:40 PM). In this example, the UAV 104 may fly anywhere in the designated clearance zone 602 until the clearance has expired.

Although the flight plans described above are provided in relation to diagrams, flight plans may be encoded/presented using any format. For example, a flight plan may be represented and passed to the UAV 104 using an extensible markup language (XML) based format or another encoding or representation that is decodable and parseable by a machine.

Figure 7:
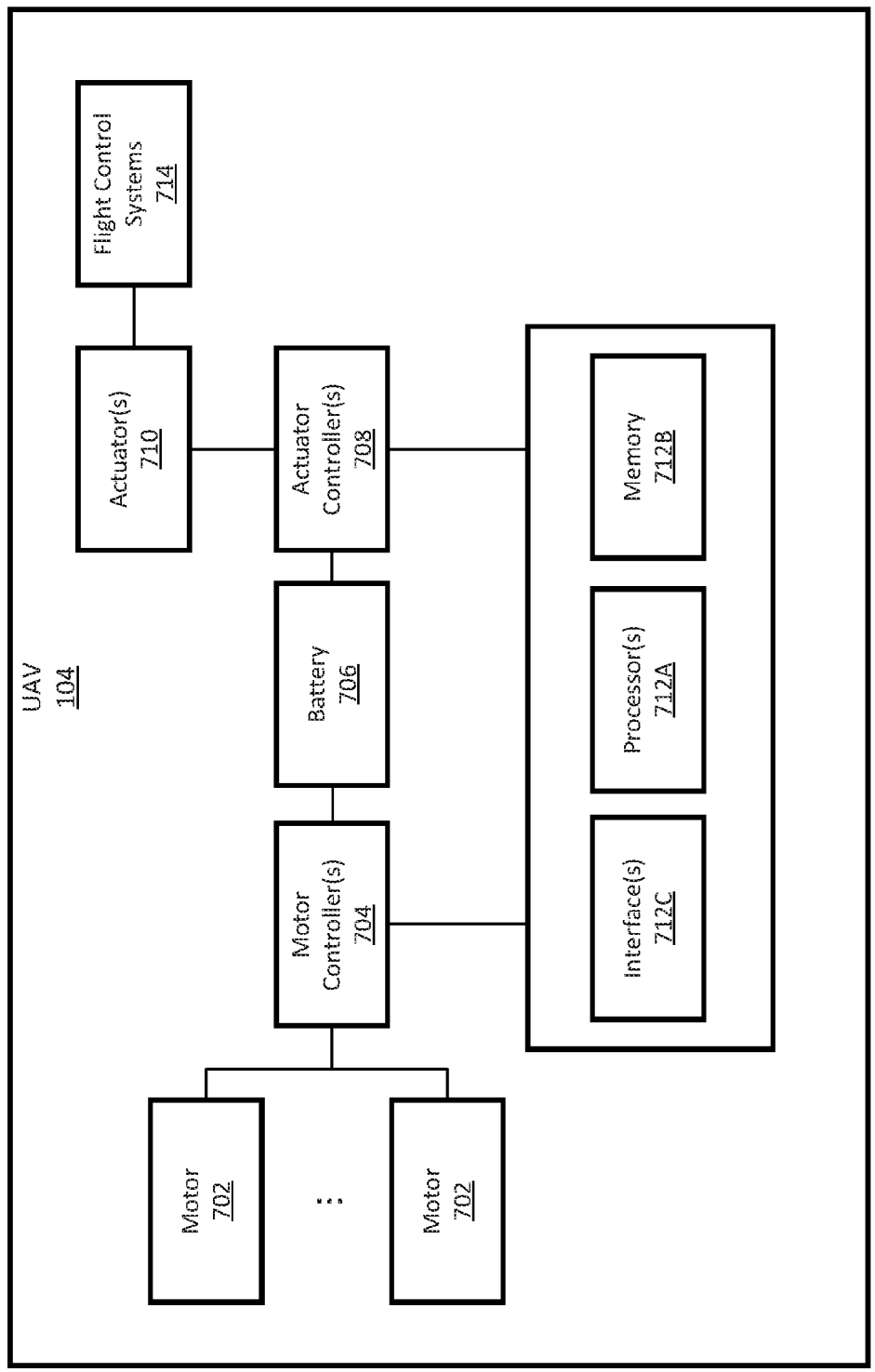
FIG. 7 illustrates a block diagram of a UAV according to one embodiment.

FIG. 7 shows a block diagram of a UAV 104 according to one example embodiment. Each element of the UAV 104 will be described by way of example below and it is understood that each UAV 104 may include more or less components than those shown and described herein.

As shown in FIG. 7, a UAV 104 may include a set of motors 702 controlled by one or more motor controllers 704, which control the speed of rotation of the motors (e.g., rounds per minute). As used herein, the term engine may be used synonymously with the term motor and shall designate a machine that converts one form of energy into mechanical energy. For example, the motors 702 may be electrical motors that convert electricity stored in the battery 706 into mechanical energy. The UAV 104 may include any number of motors 702 that are placed in any configuration relative to the body and/or an expected heading of the UAV 104. For example, the motors 702 may be configured such that the UAV 104 is a multirotor helicopter (e.g., a quadcopter). In other embodiments, the motors 702 may be configured such that the UAV 104 is a fixed wing aircraft (e.g., a single engine or dual engine airplane). In these embodiments, the motors 702, in conjunction with other elements of the UAV 104 serve to keep the UAV 104 in flight and/or propel the UAV 104 in a desired direction. In some embodiments, the UAV 104 may not include motors 702 for propelling the UAV 104 forward. In this embodiment, the UAV 104 may be a glider or lighter than air craft (e.g., a weather balloon).

As noted above, the motors 702 are controlled by one or more motor controllers 704, which govern the speed of rotation of each motor 702. In one embodiment, the motor controllers 704 may work in conjunction with actuator controllers 708 and actuators 710 that control the pitch/ angle/rotation of propellers, flaps, slats, slots, rotors, rotor blades/wings, and other flight control systems 714. The motor controllers 704 and actuator controllers 708 may be managed/controlled by one or more processors 712A that are communicatively coupled to a memory 712B and one or more interfaces 712C.

In some embodiments, the memory 712B may store instructions that when executed by the processors 712A cause the UAV 104, via adjustments to settings/parameters of the motor controllers 704 and actuator controllers 708, to move in a particular direction (vertical or horizontal) or maintain a particular flight pattern (e.g., hover at a particular altitude).

The UAV 104 may communicate with one or more other devices using the one or more interfaces 712C. In one embodiment, one of the interfaces 712C in a UAV 104 may comply with a 3GPP protocol. For example, the interface 712C may adhere to one or more of Global System for Mobile communication (GSM) (including General Packet Radio Service (GPRS) and Enhanced Data Rates for GSM Evolution (EDGE)), UMTS (including High Speed Packet Access (HSPA)), and Long Term Evolution (LTE). In some embodiments, one or more interfaces 712C in the UAV 104 may allow a UAV operator 304 and/or other parts of the UTM system 300A to control or provide plans/instructions to the UAV 104.

In one embodiment, the UAV 104 may operate in the Evolved Universal Mobile Telecommunications System (UMTS) Terrestrial Radio Access Network (E-UTRAN) 318A, the Universal Terrestrial Radio Access Network (UTRAN) 318B, and/or the GSM EDGE Radio Access Network (GERAN) 318C using one or more of the interfaces 712C. The E-UTRAN 318A, the UTRAN 318B, and/or the GERAN 318C may be administered by a network operator (e.g., a cellular network operator) and the UAV 104 may be a subscriber to one or more of these networks 318A, 318B, and 318C. The E-UTRAN 318A, the UTRAN 318B, and/or the GERAN 318C may comprise various network devices. Each of the network devices may, in some embodiments, be electronic devices that can be communicatively connected to other electronic devices on the network (e.g., other network devices, user equipment devices (such as the UAV 104), radio base stations, etc.). In certain embodiments, the network devices may include radio access features that provide wireless radio network access to other electronic devices such as user equipment devices (UEs) (for example a "radio access network device" may refer to such a network device). For example, the network devices may be base stations, such as an eNodeB in Long Term Evolution (LTE), a NodeB in Wideband Code Division Multiple Access (WCDMA), or other types of base stations, as well as a Radio Network Controller (RNC), a Base Station Controller (BSC), or other types of control nodes. Each of these network devices that include radio access features to provide wireless radio network access to other electronic devices may be referred to cells (e.g., the cells 106A-106D), towers, cellular towers, or the like. In some embodiments, an interface 712C in a UAV 104 may assist in estimating a geographical location of the UAV 104 based on communications within the E-UTRAN 318A, the UTRAN 318B, and/or the GERAN 318C.

Although described in relation to the geographical location of the UAV 104, the location information provided by the 3GPP LCS system 300B may be extended to also include additional pieces of information. For example, in addition to geographical location and velocity, the location information provided by the 3GPP LCS system 300B may also include direction/heading of the UAV 104 as estimated by the access networks E-UTRAN 318A, UTRAN 318B, and GERAN 318C. In some embodiments, the location information may describe an estimated current location, velocity, and/or heading of the UAV 104 or an anticipated location, velocity, and/or heading of the UAV 104. Further, although described in relation to obtaining location information from network provided location services/systems (e.g., 3GPP Location Services (LCS)), in other embodiments other location services/systems may be used (e.g., the Global Positioning System (GPS)).

A UAV operator 304 may maintain a connection with a corresponding UAV 104 via connection 334. The connection 334 may be established through one or more interfaces 712C and may form a wireless command and control (C2) connection that allows the UAV operator 304 to control the UAV 104 through direct commands and/or through issuance of a flight plan. In some embodiments, the connection 334 may additionally allow the UAV operator 304 to receive data from the UAV 104. For example, the data may include images, video streams, telemetry data, and system status (e.g., battery level/status). In some embodiments, the connection 334 may be a point-to-point (e.g., mesh) connection while in other embodiments the connection 334 between the UAV operator 304 and the UAV 104 may be part of a distributed network. In one embodiment, the connection 334 is separate from the access networks E-UTRAN 318A, UTRAN 318B, and GERAN 318C while in other embodi- ments the connection 334 is part of one of the access networks E-UTRAN 318A, UTRAN 318B, and GERAN 318C.

In one embodiment, the UAV operator 304 may maintain a connection with other elements of the UTM system 300A. For example, the UAV operator 304 may maintain connection 336 with a UAV Service Supplier (USS) 320. In some embodiments, the connection 336 may be a point-to-point connection while in other embodiments the connection 336 may be part of a distributed network. In one embodiment, the connection 336 is separate from the access networks E-UTRAN 318A, UTRAN 318B, and GERAN 318C while in other embodiments the connection 336 is part of one of the access networks E-UTRAN 318A, UTRAN 318B, and GERAN 318C.

In one embodiment, the UAV 104 may maintain a connection with the USS 320. For example, the UAV 104 may maintain the connection 338 with USS 320. In some embodiments, the connection 338 may be a point-to-point connection while in other embodiments the connection 338 may be part of a distributed network. In one embodiment, the connection 338 is separate from the access networks E-UTRAN 318A, UTRAN 318B, and GERAN 3118C while in other embodiments the connection 338 is part of one of the access networks E-UTRAN 318A, UTRAN 318B, and GERAN 318C. In one embodiment, the connection 338 may allow the transmission of one or more pieces of data to the USS 320, including telemetry, authentication/authorization (e.g., using a subscriber identity/identification module (SIM) based identity to check UAV 104 registrations and authorizations), reports and logs (e.g., to establish liability in case of accidents), and commands to ensure compliance and safety (e.g., land immediately). The connection 338 may alternatively provide access to a data center to provide data for storage for the UAV 104 (e.g., storage of video streams or images captured by the UAV 104).

In one embodiment, the connection 336 allows the UAV operator 304 to transmit data to or receive data from the USS 320 regarding a current, past, or future flight. For instance, the connection 336 may allow the UAV operator 304 to convey to the USS 320 one or more of the following: airspace information, alarms and notifications, authentication/authorization (e.g., use of a SIM based identity to check UAV 104 and pilot/UAV operator 304 registrations and authorizations), and reports and logs (e.g., to establish liability in case of accidents).

In some embodiments, the UAV operator 304 may transmit a proposed flight plan to the USS 320 via the connection 336. In one embodiment, the UTM system 300A may include a plurality of USSs 320. The set of USSs 320 may alternatively be referred to as a USS network. Each USS 320 offers support for safe airspace operations based on information received from a set of stakeholders and other information sources. The USSs 320 may share information about their supported operations to promote safety and to ensure that each USS 320 has a consistent view of all UAV 104 operations and thus enable the UAV 104 to stay clear of each other.

As noted above, the USSs 320 may receive information from a variety of stakeholders and information sources such that the USSs 320 may determine whether a proposed flight plan is authorized to proceed. For example, the Federal Aviation Association (FAA) may provide directives and constraints to the USSs 320 via the Flight Information Management System (FIMS) 322. The FIMS 322 provides administration officials a way to issue constraints and directives to the UAV operators 304 and/or the UAV 104 via a USS 320. Such constraints and directives may be based on information received from the National Airspace System (NAS) Air Traffic Management (ATM) system 324 and/or other NAS data sources 326. In this example, the ATM system 324 could be used to mark certain restricted areas (e.g., airports and military bases) for the UAV 104 or restrict flights over forest fire areas or other spaces which are normally permitted for the UAV 104. In addition to the airspace state and other data provided by the ATM system 324 and other NAS data sources 326, the FIMS 322 may provide impact data, which may describe effects caused by the UAV 104 to a common airspace. Although described in relation to U.S. regulatory authorities, the systems and methods described herein may be similarly applied using any regulatory authority/agency overseeing any jurisdiction/territory/airspace.

In addition to constraints and directives received from the FIMS 322, the USSs 320 may receive data from supplemental data service providers 328. These supplemental data service providers 328 may provide various pieces of data that are used by the USSs 320 in planning and authorizing a flight plan, including terrain, weather, surveillance, and performance information. The supplemental data service providers 328 may communicate amongst each other to insure consistency and accuracy of information. In some embodiments, the supplemental data service providers 328 may provide data that is presented/transmitted to UAV operators 304 via the USS 320 for the planning of a flight plan/mission.

In some embodiments, the USSs 320 may receive constraints from public safety sources 330. This information may limit UAV 104 missions over areas when such flights may negatively affect public safety. For example, UAV 104 missions may be limited over areas that are currently hosting events with large crowds of people. In some embodiments, the public safety sources 330 may provide data that is presented/transmitted to UAV operators 304 via the USS 320 for the planning of a flight plan/mission. The USSs 320 may also make UAV 104 flight/operation information available to the public 332.

As noted above, the USS 320 may determine if a proposed flight plan is authorized in view of directives, constraints, and information received from various stakeholders/sources. After concluding that the proposed flight plan is authorized or not authorized to proceed, the USS 320 may transmit a response to the UAV operator 304. In response to receiving an authorized flight plan, the UAV operator 304 may begin controlling the UAV 104 to effectuate the authorized flight plan or the UAV operator 304 may transmit the authorized flight plan or some set of instructions describing the objectives of the authorized flight plan to the UAV 104. Based on inputs from the UAV operator 304, the processor 712A together with instructions stored in the memory 712B may control the motor controllers 704 and/or actuators 710 to achieve the objectives of the flight plan.

To ensure that the UAV 104 does not deviate from the authorized flight plan, the USS 320 may make use of geographical location information (e.g., the current location of the UAV 104). In one embodiment, this location information may be received/accessed by the UTM system 300A, via a Location Service (LCS) client 308, from the 3GPP LCS system 300B. The 3GPP LCS system 300B may represent a service standardized by various organizations. For example, the 3GPP LCS system 300B may be covered under Global System for Mobile Communications (GSM) and Universal Mobile Telecommunications Service (UMTS). As described herein, the 3GPP LCS system 300B specifies network elements/entities, the functionalities of all elements/entities, interfaces for inter/intra element/entity communications, as well as messages used to implement positioning functionality in a network. The 3GPP LCS system 300B may include access to location information, such as longitude and latitude coordinates, altitude, velocity, and direction/heading of a UAV 104. In one embodiment, the location information may be provided at a prescribed interval (e.g., every minute), upon request, or in response to an event (e.g., a UAV 104 entering a specified area).

As shown, the 3GPP LCS system 300B may include a Gateway Mobile Location Centre (GMLC) 306, which contains functionality required to support location services. The GMLC 306 may act as the gateway to the 3GPP LCS system 300B for the UTM system 300A. As such, the GMLC 306 is generally the first node an external LCS client 308 of the UTM system 300A accesses when attempting to obtain location information from the 3GPP LCS system 300B. As shown, the LCS client 308 within the UTM system 300A may access/communicate with the GMLC 306 via the Le interface. In some embodiments, the Le interface may require extensions to provide additional information (e.g., altitude information to provide three-dimensional geo-fencing zones). The GMLC 306 may be network/network operator specific and each network may include one or more GMLCs 306.

In one embodiment, the GMLC 306 may be communicatively coupled to various support services, including a Home Subscriber Server (HSS) 310, a Privacy Profile Register (PPR) 312, and a Pseudonym Mediation Device (PMD) 314. For example, the GMLC 306 may request information from the HSS 310 via the Lh or SLh interfaces. The HSS 310 may contain or have access to a master user database that supports network access. For example, the HSS 310 may contain or have access to subscription-related information (subscriber profiles) for performing authentication and authorization of users (e.g., authentication of an account associated with an interface 712C of the UAV 104). In some embodiments, the HSS 310 can provide information about the subscriber's location and Internet Protocol (IP) information. In some embodiments, the HSS 310 may function similarly to a GSM home location register (HLR) and/or an Authentication Centre (AuC).

In some embodiments, the UTM system 300A may request and receive network subscription information associated with a UAV 104. In particular, since the 3GPP LCS system 300B is network operator specific, the UTM system 300A must be aware of which network operator and what account is associated with a UAV 104. Upon receipt of network subscription information associated with a UAV 104, the LCS client 308 may pass along this information to an applicable GMLC 306 (e.g., a GMLC 306 associated with the network operator designated in the received subscription information). A GMLC 306 that received this information may work in conjunction with the HSS 310 and/or another support service in the 3GPP LCS system 300B to access location information associated with the applicable UAV 104.

In some embodiments, the GMLC 306 may utilize the PPR 312 to perform a privacy check via the Lpp interface. In some embodiments, the HSS 310 may provide the GMLC 306 with an address to access the PPR 312. Although shown as separate, in some embodiments, the PPR 312 may be integrated within the GMLC 306.

In some embodiments, the GMLC 306 may utilize the PMD 314 to translate a pseudonym of a target UAV 104 with a verinym/true identity (e.g., International Mobile Subscriber Identity or Mobile Station Integrated Services Data Network) via the Lid interface.

The PMD 314 may be separate from the GMLC 306 and the PPR 312 or integrated within either.

The GMLC 306 may send positioning/location requests to various controllers 316 associated with separate wireless networks 318. In response to the requests, the controllers 316 coordinate and submit final location estimates of a corresponding UAV 104 to the GMLC 306. In some embodiments, the GMLC 306 may communicate via the Lg (Mobile Application Part-based) or Lgd (Diameter-based) interfaces with a 2G Serving General Packet Radio Service (GPRS) Support Node (SGSN) 316A or via the Lg interface with a 2G Mobile services Switching Centre (MSC) 316B for a GSM EDGE Radio Access Network (GERAN) 318C. In this embodiment, the 2G-SGSN 316A may communicate with the GERAN 318C via the Gb interface and the 2G-MSC 316B may communicate with the GERAN 318C via the A interface. The 2G-SGSN 316A and the 2G-MSC 316B may manage charging/billing, location request management, authorization of location services, and general operation of location services for the GERAN 318C.

In some embodiments, the GMLC 306 may communicate via the Lg or Lgd interfaces with a 3G-SGSN 316C or via the Lg interface with an MSC server 316D for a Universal Terrestrial Radio Access Network (UTRAN) 318B. In this embodiment, the 3G-SGSN 316C and the MSC server 316D may communicate with the UTRAN 318B via the Iu interface. The 3G-SGSN 316C and the MSC server 316D may manage charging/billing, location request management, authorization of location services, and general operation of location services for the UTRAN 318B.

In some embodiments, the GMLC 306 may communicate via the SLg interface with a Mobility Management Entity (MME) 316E of an Evolved Universal Mobile Telecommunications System (UMTS) Terrestrial Radio Access Network (E-UTRAN) 318A. In this embodiment, the MME 316E may communicate with the E-UTRAN 318A via the S1 interface. The MME 316E may manage charging/billing, location request management, authorization of the LCS services, and general operation of location services for the E-UTRAN 318A.

As noted above, the access networks E-UTRAN 318A, UTRAN 318B, and GERAN 318C may estimate the location of a UAV 104 and make this location information available to other systems (e.g., the UTM system 300A). In particular, the access networks E-UTRAN 318A, UTRAN 318B, and GERAN 318C, that facilitate determination of the locations of user equipment (e.g., the UAV 104), are able to exchange location information with the core network (e.g., the controllers 316 and/or the GMLC 306) when connected to the core network. Location information may also be communicated between GMLCs 306, located in the same or a different public land mobile network (PLMN), via the specified GMLC to GMLC interface.

As noted above, the UTM system 300A may include a LCS client 308. The LCS client 308 may bridge the UTM system 300A and the 3GPP LCS system 300B to allow air traffic system 300 to manage flights of the UAV 104 based on the location information provided by the 3GPP LCS system 300B. In particular, the UTM system 300A may ensure that the UAV 104 adhere to directives, constraints, approved flight plans, approved deviations, and other rules and regulations based on locations provided in real time via the LCS client 308 and the GMLC 306.

In one embodiment, the UTM system 300A may make a flight plan, including a flight path, available to a controller 316 of a corresponding access network to which the UAV 104 is currently connected via the connection 340. Providing the flight path to one or more controllers 316 allows the controllers 316 to manage a handover procedure in a more efficient manner. In particular, as described in greater detail below, since it is known based on an approved flight path that the UAV 104 will re-enter a network coverage area of the network after a temporary disconnection, a target cell for the handover procedure may be determined based on this approved flight path prior to the UAV 104 disconnecting from a source cell. In some embodiments, spoofing of messages and caching of data may be performed for an estimated reconnection duration to minimize effects caused by the UAV 104 temporarily losing network access.

In some embodiments, the connection 340 may be a point-to-point connection while in other embodiments the connection 340 may be part of a distributed network. In one embodiment, the connection 340 is separate from the access networks E-UTRAN 318A, UTRAN 318B, and GERAN 3118C while in other embodiments the connection 340 is part of one of the access networks E-UTRAN 318A, UTRAN 318B, and GERAN 318C.

In some embodiments, one or more of the portions of the air traffic system 300 may be implemented through virtualization. For example, a cloud execution environment (e.g., one or more virtual machines or containers) may be used by the GMLC 306 to manage requests from the LCS client 308.

Figure 8:
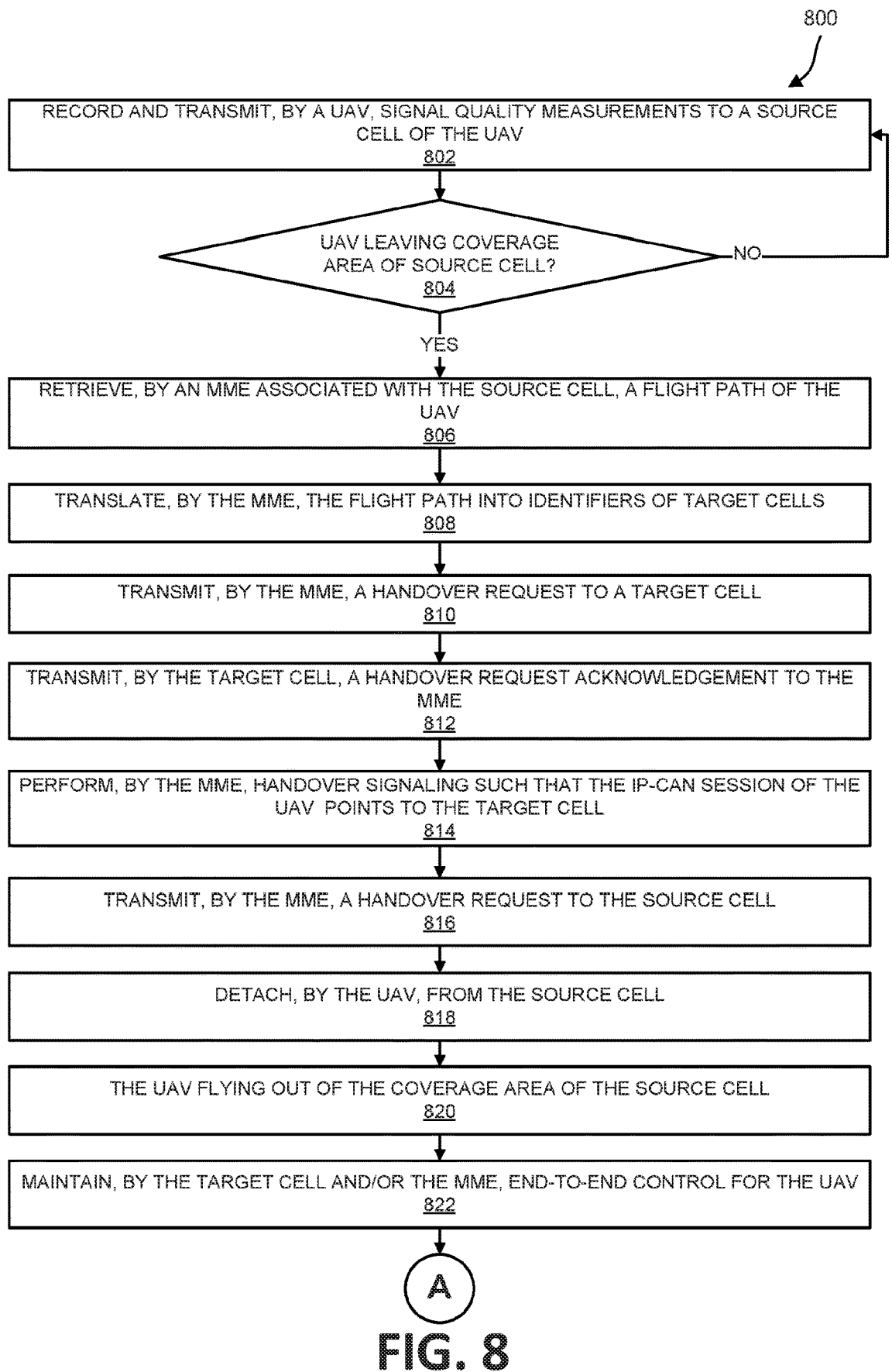
FIG. 8 illustrates a method for managing a handover in the wireless network according to one embodiment.
Figure 9:
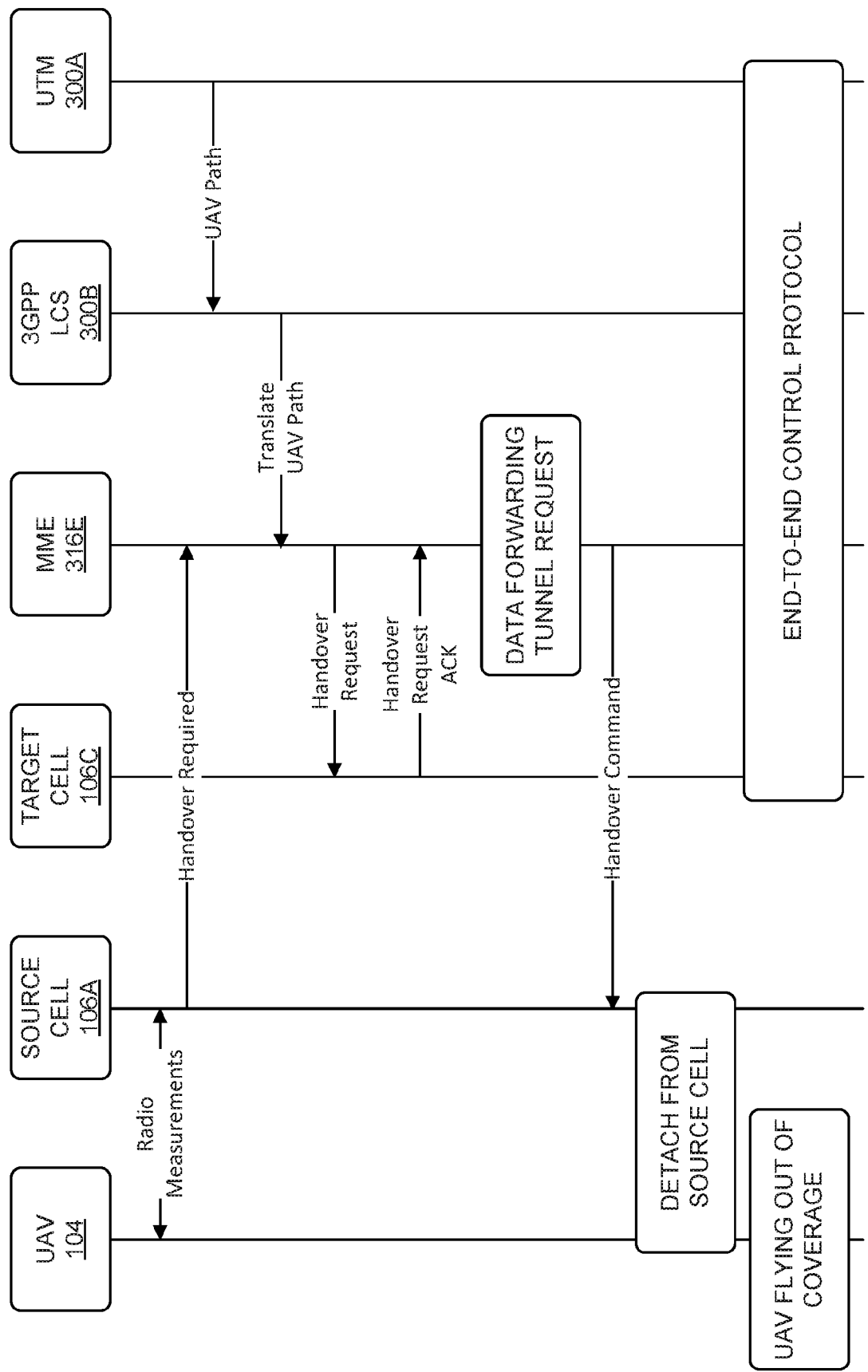
FIG. 9 illustrates an example exchange for initiating a handover according to one embodiment.

Turning now to FIG. 8, a method 800 according to one embodiment will be described for managing a handover in a wireless network. Although described in relation to a 3GPP network (e.g., a Long-Term Evolution (LTE) network), the method 800 may be performed by or in relation to any similar type of network. The method 800 may be read in conjunction with the example exchange shown in FIG. 9 and the example scenario shown in FIGS. 1 and 2. For example, the method 800 may be performed while the UAV 104 is flying according to a flight path 102 authorized/approved by the UTM 300A as shown in FIGS. 1 and 2. In some embodiments, the UAV 104 is flying autonomously according to the flight path 102 while in other embodiments the UAV 104 is flying using commands received from a UAV operator 304 to traverse the flight path 102.

In one embodiment, the method 800 may commence at operation 802 with a UAV 104 periodically recording and transmitting signal quality measurements to a source cell 106 (e.g., an eNodeB). The source cell 106 is the cell in the wireless network 100 that the UAV 104 is presently connected to while operating in the wireless network 100. For example, the source cell 106 in FIG. 1, which will be used for the remainder of method 800, may be the cell 106A as the UAV 104 is currently in the coverage area 108A of the cell 106A and is connected to this cell 106A. The signal quality measurements may be signal-to-noise ratio measurements, power measurements, or any other similar signal quality measurements. The signal quality measurements may be recorded based on normal transmissions within the wireless network 100 or may be dedicated signal quality transmissions. Further, in some embodiments, the signal quality measurements may be reported as part of other transmissions in the wireless network 100 (e.g., metadata or additional data that is conveyed along with telemetry data) or may be dedicated signal quality measurement transmissions.

At operation 804, the source cell 106A may analyze the signal quality measurements received from the UAV 104 to determine if the UAV 104 is leaving a coverage area 108A provided by the source cell 106A. As the UAV 104 moves away from the source cell 106A and towards the outer edges of the coverage area 108A provided by the source cell 106A, the signal quality measurements will show a deterioration of the signal quality experienced by the UAV 104 from the source cell 106A. In one embodiment, the UAV 104 leaving a coverage area 108A of the source cell 106A may be determined based on one or more of the signal quality measurements falling below a corresponding set of predefined signal quality thresholds.

Upon determining at operation 804 that the UAV 104 is not leaving the coverage area 108A of the source cell 106A, the method 800 may return to operation 802 to continue to record and transmit signal quality measurements to the source cell 106A. Although described below as the source cell 106A performing operation 804, in some embodiments, the determination at operation 804 may be performed by another component of the wireless network 100. For example, operation 804 may be performed by a MME 316E associated with the source cell 106A. Although the MME 316E is used throughout the description of the method 800, in other embodiments, another controller 316 may be used.

Upon determining at operation 804 that the UAV 104 is leaving the coverage area 108A of the source cell 106A, the source cell 106A may transmit a handover request to the MME 316E. The handover request initiates the handover procedure in which the UAV 104 moves from a source cell 106 to a target cell 106. In many cases the target cell 106 for a handover procedure cannot be determined at this stage since the UAV 104 has not entered into coverage areas 108 of candidate target cells 106 such that the UAV 104 may record signal quality measurements from these candidates to select the most appropriate target cell 106. The method 800 overcomes this uncertainty in relation to the UAV 104 handover by obtaining the flight path 102 of the UAV 104 at operation 806. In one embodiment, the flight path 102 may be retrieved from a UTM 300A that manages the airspace being traversed by the UAV 104. This retrieval may be made by the MME 316E directly from the UTM system 300A (through the LCS client 308) while in other embodiments, the flight path 102 may be retrieved via another component of the 3GPP LCS 300B (e.g., the GMLC 306) such that the path 102 may be translated as described in greater detail below. The flight path 102 may include one or more of a starting point, an ending point, and/or a set of waypoints defined by longitudinal and latitudinal coordinates. Although described herein as only receiving a flight path 102, in some embodiments, the MME 316E may request additional information regarding the flight of the UAV 104, including a set of velocities, a set of altitudes, a heading/direction, a set of events (e.g., capture video at prescribed times or locations, hover over an area for a specified interval, etc.), a time/duration, a set of permitted zones/areas (e.g., fly-only zones), and a set of restricted zones/areas (e.g., no-fly zones).

Prior to the flight of the UAV 104 and consequently prior to performance of the method 800, a proposed flight path may have been transmitted from the UAV operator 304 to the USS 320 of the UTM 300A via any technique, including submission through a web portal. After receiving the proposed flight path, the USS 320 may attempt to verify that the proposed flight path does not violate any constraints/directives. In one embodiment, the USS 320 may transmit the proposed flight path to the FIMS 322 to obtain confirmation that the proposed flight path does not violate any directives/constraints or the USS 320 may process approval/authorization of the path directly based on directives/constraints received from the FIMS 322 and other sources (e.g., supplemental data service providers 328). This approved/authorized flight path 102 may be retrieved by the MME 316E at operation 806.

In one embodiment, the flight path 102 may be retrieved once and subsequently used for several handover procedures of the UAV 104. Although described as obtaining the flight path 102 only after commencing the method 800, in some embodiments, the MME 316E or other components of the wireless network 100 may have requested the flight path 102 at an earlier point in time (e.g., upon the UAV 104 first associating with the wireless network 100).

At operation 808, the flight path 102 may be translated into a set of identifiers corresponding to the cells 106 along the flight path 102. The identified cells 106 are cells 106 that the UAV 104 may connect to or associate with along different portions of the flight path 102. For example, the translation may include a target cell 106 for each portion of the flight path 102. Accordingly, the translation at operation 808 may include a determination of a target cell 106 for each handover of the flight path 102. In some embodiments, the identified cells 106, which are target cells 106 along the flight path 102, may be cells 106 that are closest to the flight path 102, cells 106 whose coverage areas 108 most overlaps with the flight path 102, or some combination of proximity and coverage area 108 overlap. In one embodiment, the flight path 102 may be translated into a set of cell 106 identifiers by the MME 316E using 3GPP LCS 300B provided by the wireless network 100. For example, the GMLC 306 may translate the flight path 102 alone or in conjunction with the MME 316E. As noted above in relation to operation 806, the translation at operation 808 may be performed once for each flight path 102 of the UAV 104 and subsequently used for multiple handover procedures while the UAV 104 traverses the flight path 102.

Once the target cell 106 is known for the current portion of the flight path 102, the handover signaling can continue. As shown in the examples in FIGS. 1 and 2 and as will be used for the remainder of the description related to the method 800, the source cell for a portion of the flight path 102 may be the cell 106A and the target cell 106 may be the cell 106C. In one embodiment, handover signaling may include the MME 316E sending a handover request to the target cell 106C at operation 810. In some embodiments, multiple target cells 106 may be identified for a particular portion of the flight path 102. In these embodiments, handover requests may be transmitted to each of these target cells 106 at operation 810.

In one embodiment, the handover request(s) sent at operation 810 may include a new option that informs the target cell 106C about when the UAV 104 is predicted to move within the coverage area 108C of the target cell 106C. For example, in one embodiment, the option may be a time value corresponding to the estimated time that the UAV 104 will take between leaving the coverage area 108A of the source cell 106A and entering the coverage area 108C of the target cell 106C. In another embodiment, the option may be a time value corresponding to the estimated time that the UAV 104 will take between disconnecting from the source cell 106A and connecting to the target cell 106C. In yet other embodiments, the option may be a time value corresponding to the estimated time between when the handover request is received at the target cell 106C and when the UAV 104 will connect to the target cell 106C or enter the coverage area 108C. In still other embodiments, the option may be a time value corresponding to the estimated time when the UAV 104 will connect to the target cell 106C or enter the coverage area 108C. In each of these embodiments, the time value of the handover request may be estimated/set based on the flight path 102 of the UAV 104 that was received from the UTM system 300A. Based on this option/time value, the target cell 106C may set and start a timer. As will be described in greater detail below, if the timer expires and the UAV 104 has not connected to the target cell 106C, something unpredictable may be assumed to have happened to the UAV 104. For example, the UAV 104 may have crashed, performed a failure condition (e.g., an emergency landing) or otherwise veered off the flight path 102. In this situation, the wireless network 100 may report the handover failure of the UAV 104 to the UTM 300A.

In one embodiment, the handover request may include an indication of a set of links, sessions or services associated with the UAV 104 that should be maintained during the handover. For example, the handover request may indicate a set of links that require periodic keep alive messages from the UAV 104 to stay active (e.g., a command and control link). Based on these indications, the target cell 106C may transmit/spoof communications to maintain the set of links active. For example, to maintain a command and control link active, the target cell 106C may transmit keep alive messages on behalf of the UAV 104 (e.g., spoofing the address/origin of the messages) during the period of the timer (e.g., while the UAV 104 lacks connectivity to the wireless network 100).

In one embodiment, the handover request may include a set of links that may transmit data to the UAV 104 during the period of the timer (e.g., while the UAV 104 lacks connectivity to the wireless network 100). For example, the UAV 104 may be scheduled to receive updates for a mission on a command and control link during the period of the timer (e.g., while the UAV 104 lacks connectivity to the wireless network 100). To ensure that the UAV 104 receives these important updates, the handover request may indicate that such data transmissions should be cached by the target cell 106C. Upon the UAV 104 establishing a connection with the target cell 106C, the target cell 106C may provide the UAV 104 with the cached data.

Following receipt of the handover request at operation 810, the target cell 106C may transmit a handover request acknowledgement to the MME 316E at operation 812. Upon receipt of the handover request acknowledgement, the MME 316E may perform handover signaling to hand over the Internet Protocol-Connectivity Access Network (IP-CAN) session in the core network to point to the target cell 106C at operation 814. In one embodiment, operation 814 may include transmission of the data forwarding tunnel request to cause future communications for the UAV 104 to pass through the target cell 106C.

Concurrently or after the IP-CAN session is handed over, the MME 316E may transmit a handover command to the source cell 106A at operation 816. The handover command initiates the UAV 104 to detach from the source cell 106A and consequently detach from the wireless network 100 at operation 818. For example, receipt of the handover command may cause the UAV 104 and the source cell 106A to close down connectivity between each other at operation 818. This disconnection coincides with the UAV 104 flying out of coverage area 108A of the source cell 106A at operation 820. However, as discussed above, the target cell 106C and/or the serving gateway (e.g., the MME 316E) may keep the end-to-end control connections open. For example, in some embodiments, at operation 822, the target cell 106C and/or the serving gateway may reply on behalf of the UAV 104 and/or cache control messages targeted for the UAV 104 that cannot reply by mirroring functionality of the UAV 104 as discussed above.

Figure 10:
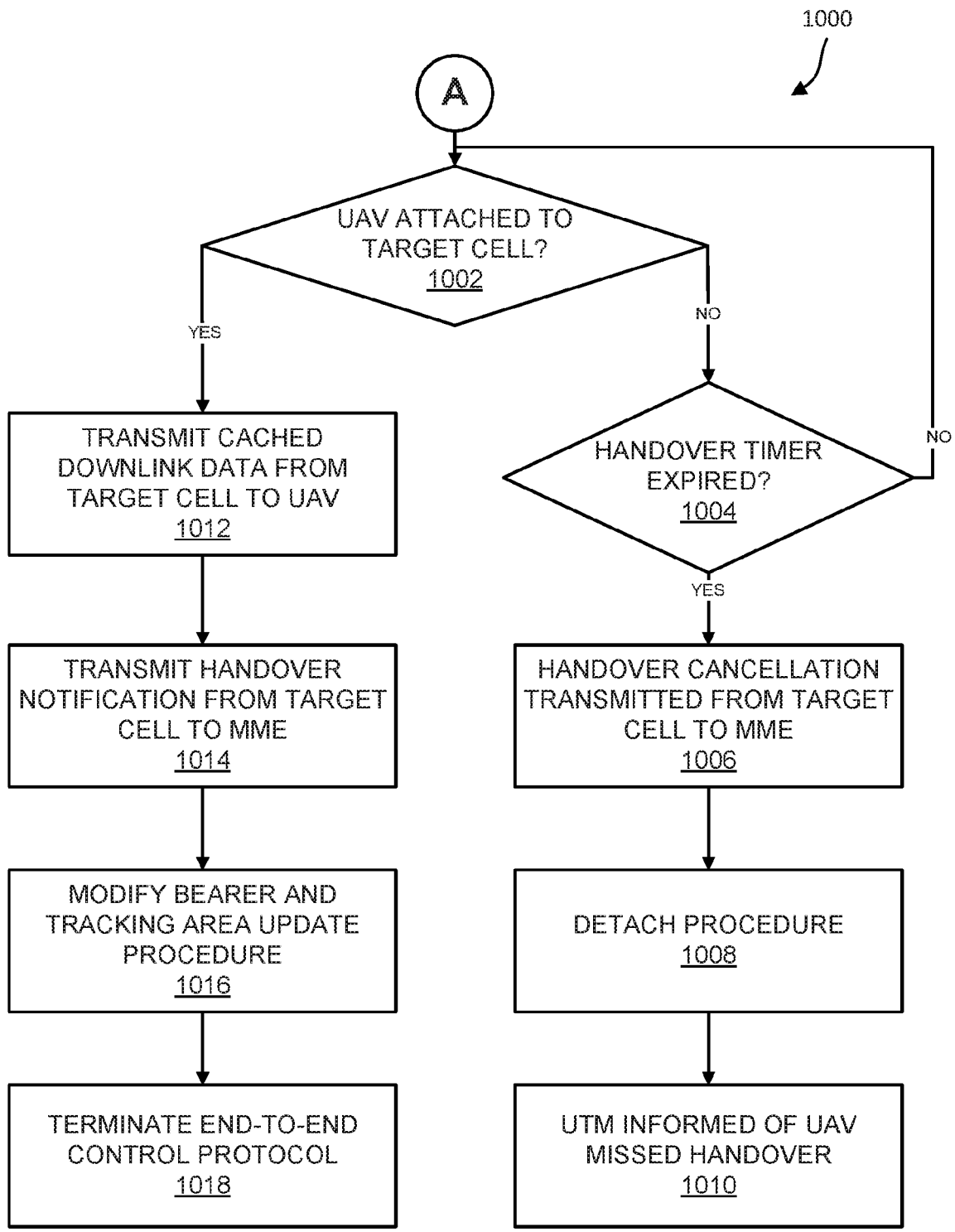
FIG. 10 illustrates a method for managing a handover in the wireless network according to one embodiment.
Figure 11:
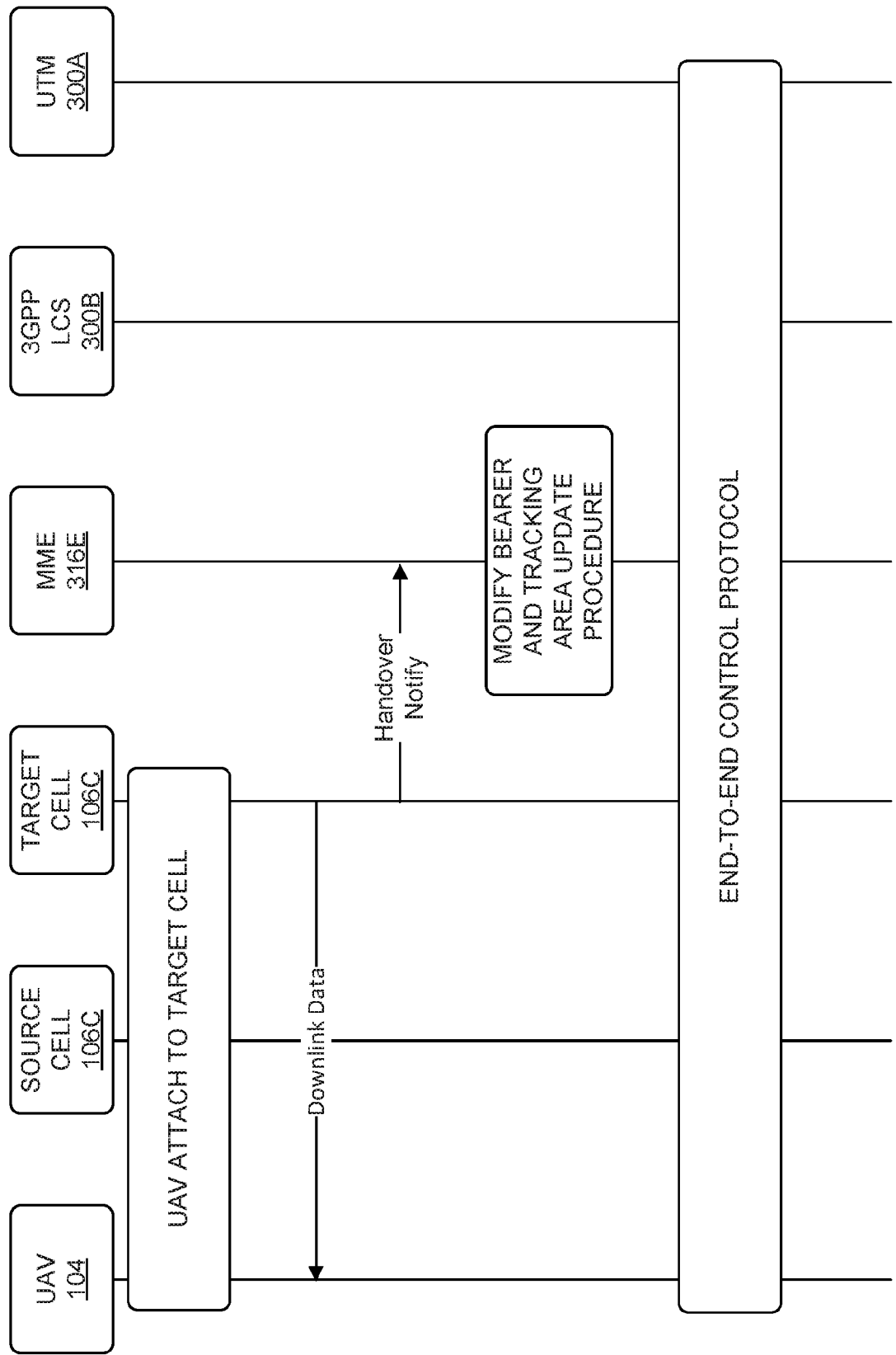
FIG. 11 illustrates an example exchange for successfully completing a handover according to one embodiment.

Turning now to FIG. 10, a method 1000 according to one embodiment will be described for managing a handover in a wireless network. In some embodiments, the method 1000 may be performed after performance of the method 800. Similar to the method 800, the method 1000 will be described in relation to a 3GPP network (e.g., an LTE network). However, the method 1000 may be performed by or in relation to any similar type of network. The method 1000 may be read in conjunction with the example exchanges shown in FIGS. 11 and 12 and the example scenario shown in FIGS. 1 and 2. For example, the method 1000 may be performed while the UAV 104 is flying according to a flight path 102 authorized/approved by the UTM 300A, as shown in FIGS. 1 and 2. In some embodiments, the UAV 104 is flying autonomously according to the flight path 102 while in other embodiments the UAV 104 is flying using commands received from a UAV operator 304 to traverse the flight path 102.

The method 1000 may commence at operation 1002 with the wireless network 100 determining whether the UAV 104 has attached to the target cell 106C. In one embodiment, the target cell 106C and/or the MME 316E may perform operation 1002. As noted above in relation to the method 800, the UAV 104 previously detached from the source cell 106A and consequently from the wireless network 100. However, the handover procedure has estimated, based on the flight path 102 of the UAV 104 received from the UTM system 300A, that the UAV 104 will likely rejoin the wireless network 100 by connecting to the target cell 106C.

Upon determining that the UAV 104 has not connected to the target cell 106C, operation 1004 may determine whether a timer associated with the handover procedure has expired. As described above in relation to the method 800, the timer may indicate, for example, the estimated/predicted amount of time between the UAV 104 disconnecting from the source cell 106A and connecting to the target cell 106C. In some embodiments, estimates related to the timer may be made based on the flight path 102 of the UAV 104 received from the UTM system 300A. If operation 1004 determines that the timer has not expired, the method 1000 may return to operation 1002 to determine if the UAV 104 has connected with the target cell 106C.

Figure 12:
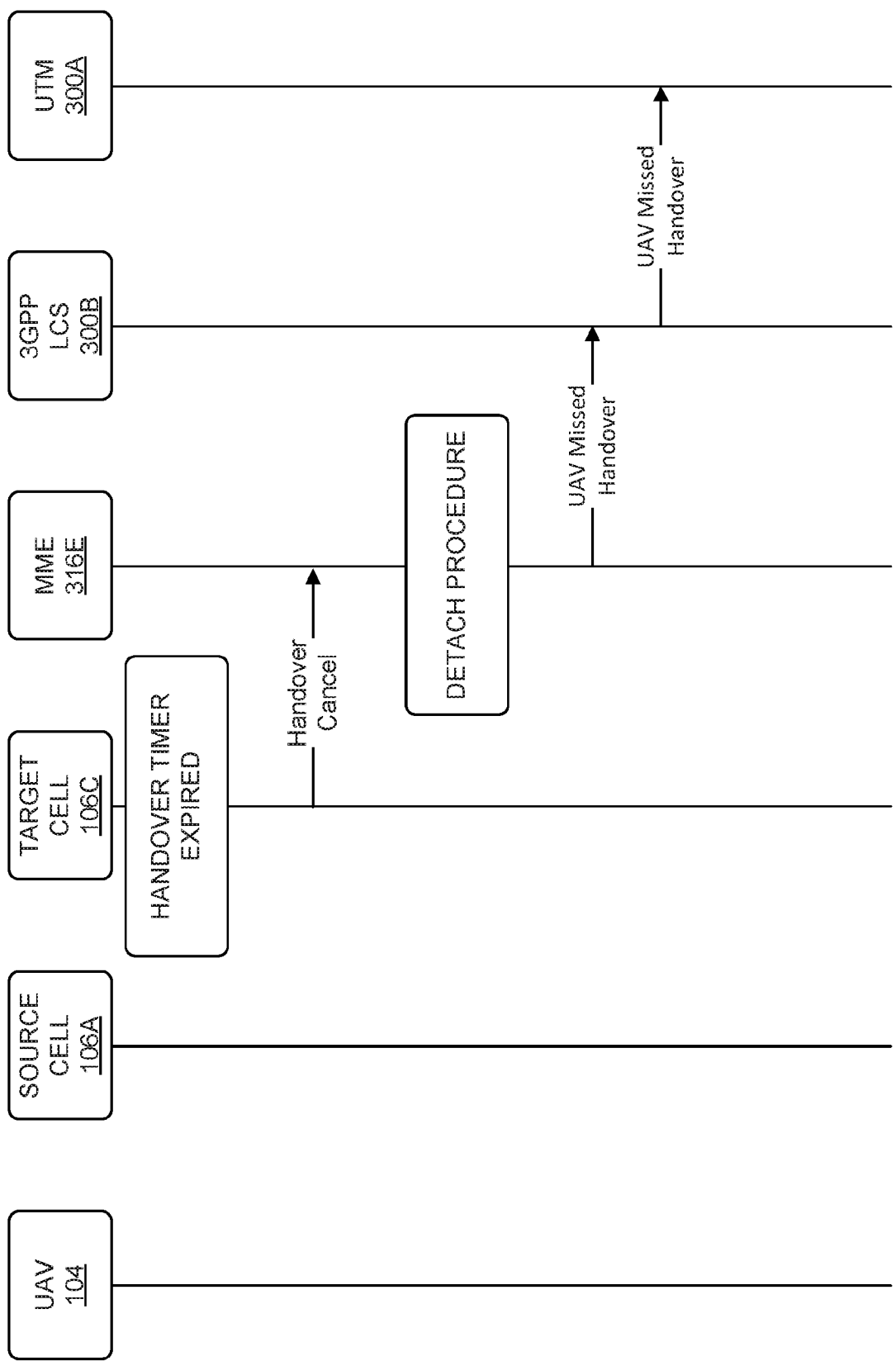
FIG. 12 illustrates an example exchange when a handover is unsuccessful according to one embodiment.

If operation 1004 determines that the timer has expired, the target cell 106C may notify the wireless network 100 at operation 1006 that the UAV 104 failed to connect to the target cell 106C by sending a handover cancel signal to the MME 316E. The handover cancel signal will initiate the detach procedure for the UAV 104 instead of a handover procedure. In one embodiment, the detach procedure at operation 1008 may cause the wireless network 100 to flush state information of the UAV 104. In some embodiments, if other cells 106 were waiting for the UAV 104 to reconnect to the network 100, the network 100 may wait for processes related to these cells 106 and the UAV 104 to timeout before initiating the detach procedure. The MME 316E can then also indicate to the UTM system 300A that the network 100 has lost connectivity with the UAV 104 at operation 1010. In one embodiment, this transmission from the MME 316E to the UTM system 300A may include the last known location of the UAV 104 and/or the time the UAV 104 was last reachable. This information can be used to direct a recovery process for the UAV 104 and/or be used by the UTM system 300A for scheduling future missions/flight paths. Following the detach procedure, the network 100 will also stop mirroring connections and caching data for the UAV 104. As shown in FIG. 12, notice that the UAV 104 missed the handover to the target cell 106C may be transmitted by the MME 316E to another component of the 3GPP LCS 300B (e.g., the GMLC 306) and thereafter forwarded to the UTM system 300A. In some embodiments, the notice/message that the handover was unsuccessful may be received by the UTM system 300A via the LCS client 308.

Returning to operation 1002, upon determining that the UAV 104 has connected to the target cell 106C, operation 1012 may transmit cached data to the UAV 104. As noted above, while the UAV 104 is disconnected from the wireless network 100, the target cell 106C and/or a controller of the target cell 104 (e.g., the MME 316E) may cache data for one or more links/sessions of the UAV 104. Upon connecting to the target cell 106C, this cached data may be forwarded/transmitted to the UAV 104. At operation 1014 the target cell 106C may issue/transmit a handover notify message to the controller (e.g., the MME 316E). Receipt of this handover notify message may cause the MME 316E to modify IP-CAN sessions/bearer and update a tracking area associated with the UAV 104 as operation 1016. In some embodiments (e.g., when the service gateway was used for caching and mirroring), the handover notify message may cause the core network to clear all stale state information. If multiple cells 106 were initiated as candidate target cells 106, those candidate target cells 106 that the UAV 104 did not connect to may be notified to clear dedicated state information related to the UAV 104. In addition, in some embodiments, the successful handover may be logged by the network 100 (e.g., the MME 316E) and/or the UTM 300A for future reference/machine learning regarding handover characteristics (e.g., information regarding the UAV 104, the flight path 102, the source cell 106A, and the target cell 106C may be logged).

At operation 1018, the end-to-end control protocol, which maintains active links/session/connections by spoofing message and/or caching data on behalf of the UAV 104, may be terminated/ceased between the UTM system 300A and the target cell 106C and/or the serving gateway. As a result, the UAV 104 will be responsible for transmitting replies to any received messages and storing/receiving data.

Figure 13A:
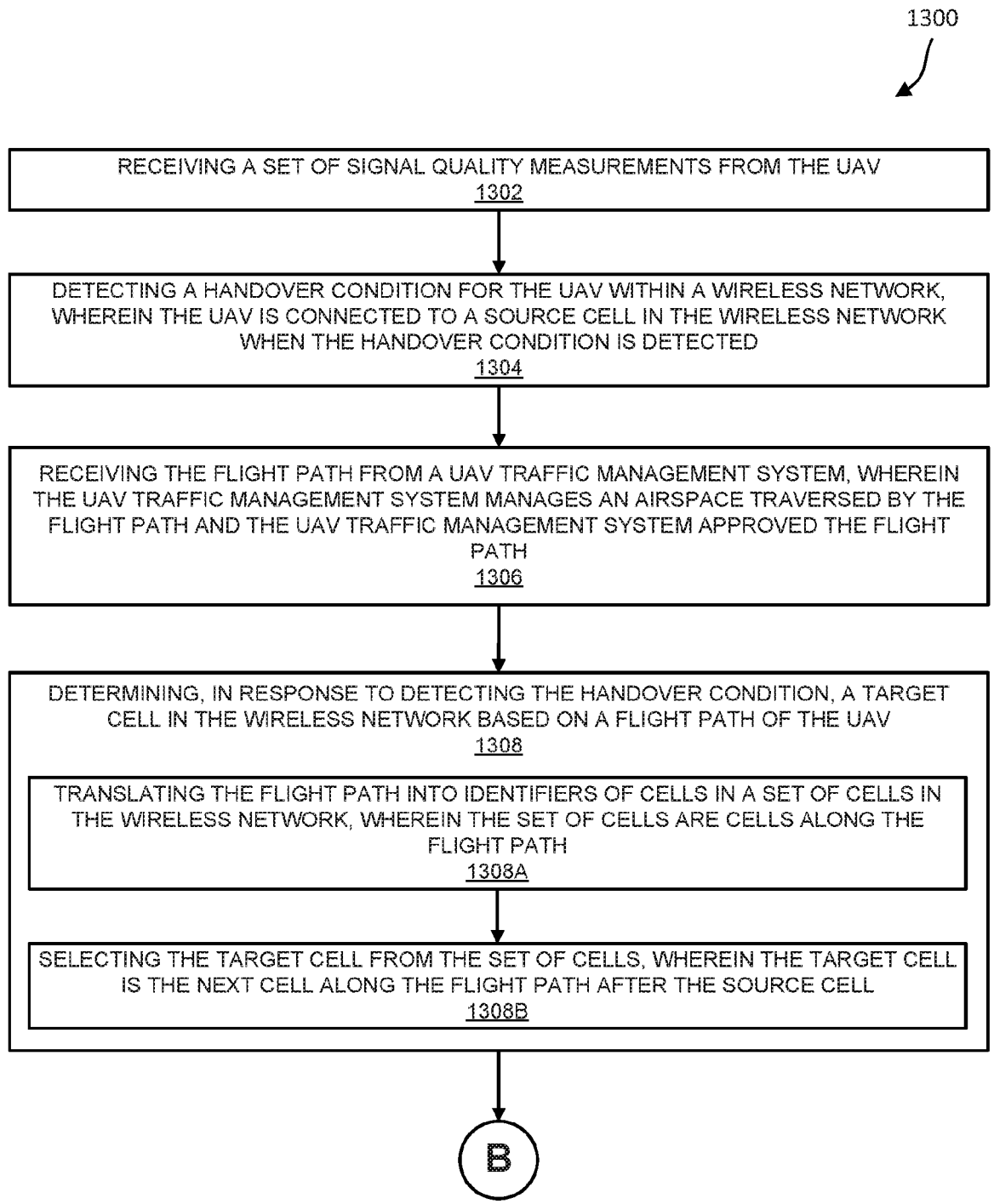
FIG. 13A illustrates a first part of a method for managing a handover in a wireless network according to one embodiment.
Figure 13B:
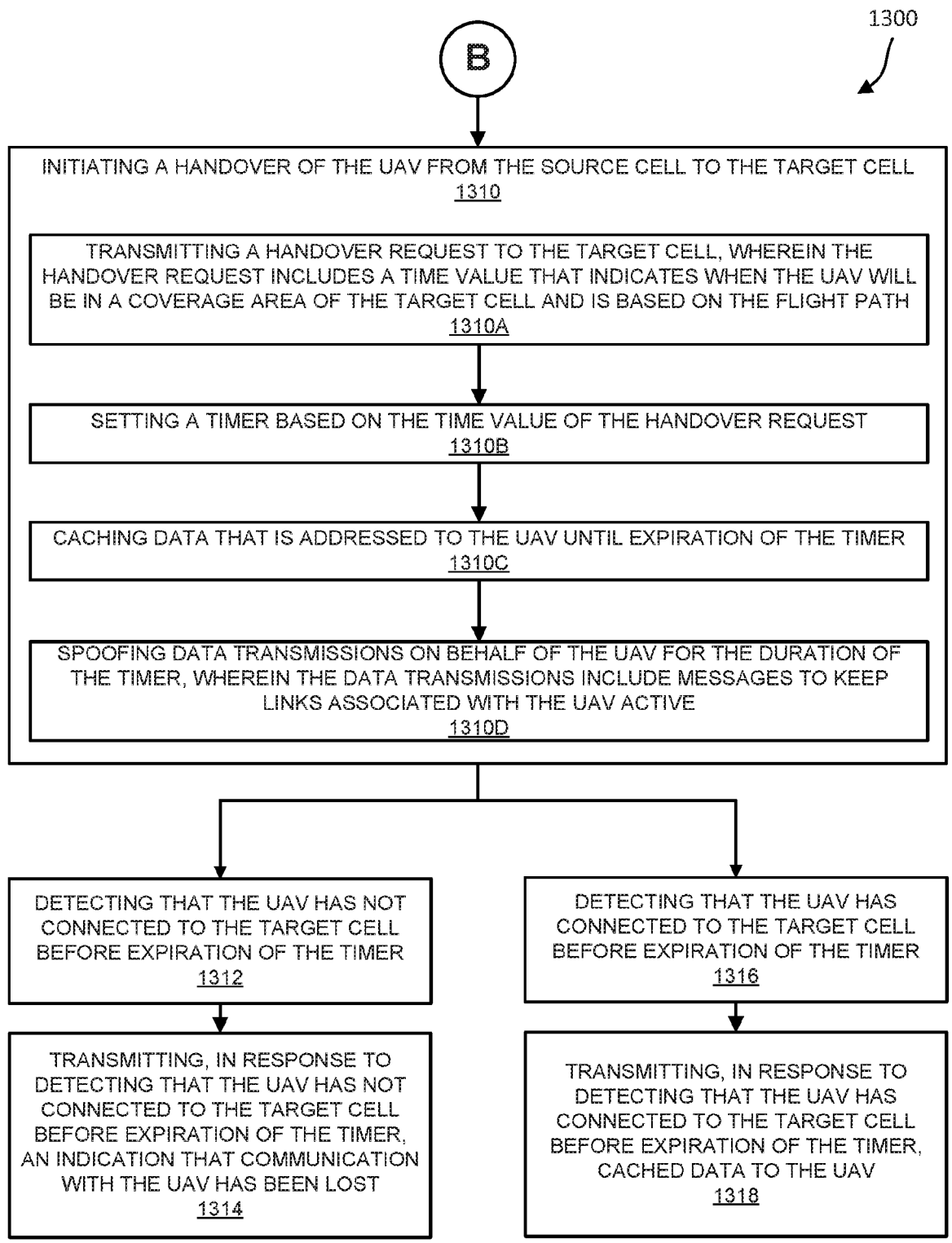
FIG. 13B illustrates a second part of a method for managing the handover in the wireless network according to one embodiment.

Turning now to FIGS. 13A and 13B, a method 1300 according to one embodiment will be described for managing a handover in a wireless network. Although described in relation to a 3GPP network (e.g., a Long-Term Evolution (LTE) network with enhanced NodeBs operating as the cells 106), the method 1300 may be performed by or in relation to any similar type of network. The method 1300 may be read in conjunction with the example scenario shown in FIGS. 1 and 2. For example, the method 800 may be performed while the UAV 104 is flying according to a flight path 102 authorized/approved by the UTM 300A as shown in FIGS. 1 and 2. In some embodiments, the UAV 104 is flying autonomously according to the flight path 102 while in other embodiments the UAV 104 is flying using commands received from a UAV operator 304 to traverse the flight path 102.

In one embodiment, the method 1300 may commence at operation 1302 with the receipt of signal quality measurements from the UAV 104. In one embodiment, the signal quality measurements may be based on signals received from a source cell 106A, to which the UAV 104 is presently connected, and may be reported to the source cell 106A. The signal quality measurements may be signal-to-noise ratio measurements, power measurements, or any other similar signal quality measurements. The signal quality measurements may be recorded based on normal transmissions within the wireless network 100 or may be dedicated signal quality transmissions. Further, in some embodiments, the signal quality measurements may be reported as part of other transmissions in the wireless network 100 (e.g., metadata or additional data that is conveyed along with telemetry data) or may be dedicated signal quality measurement transmissions.

Based on the signal measurements from operation 1302, operation 1304 may detect a handover condition for the UAV 104 within the wireless network 100. In some embodiments, the UAV 104 is connected to the source cell 106A in the wireless network 100 when the handover condition is detected. In one embodiment, the handover condition may be the UAV 104 imminently leaving a coverage area 108A of the source cell 106A. For example, as the UAV 104 moves away from the source cell 106A and towards the outer edges of the coverage area 108A provided by the source cell 106A, the signal quality measurements will show a deterioration relative to the source cell 106A. In one embodiment, the UAV 104 leaving a coverage area 108A of the source cell 106A may be determined based on one or more of the signal quality measurements falling below a corresponding set of predefined signal quality thresholds. Although described as the source cell 106A determining the handover condition, operation 1304 may be performed by another component of the wireless network 100. For example, operation 1304 may be performed by a MME 316E associated with the source cell 106A.

At operation 1306, the network 100 may receive a flight path 102 from a UAV traffic management (UTM) system 300A. In some embodiments, the UTM system 300A manages an airspace traversed by the flight path 102 and the UTM system 300A approved the flight path 102. The flight path 102 may include one or more of a starting point, an ending point, and/or a set of waypoints defined by longitudinal and latitudinal coordinates. Although described herein as only receiving a flight path 102, additional information regarding the flight of the UAV 104 may also be received at operation 1306, including a set of velocities, a set of altitudes, a heading/direction, a set of events (e.g., capture video at prescribed times or locations, hover over an area for a specified interval, etc.), a time/duration, a set of permitted zones/areas (e.g., fly-only zones), and a set of restricted zones/areas (e.g., no-fly zones).

Following receipt of the flight path 102 and in response to detecting the handover condition, operation 1308 may determine a target cell 106C in the wireless network 100 based on the flight path 102 of the UAV 104. In one embodiment, determining a target cell 106C may include translating at sub-operation 1308A the flight path 102 into identifiers of cells 106A-106D in a set of cells 106A-106D in the wireless network 100, wherein the set of cells 106A-106D are cells 106 along the flight path 102, and selecting at sub-operation 1308B the target cell 106C from the set of cells 106A-106D, wherein the target cell 106C is the next cell 106 along the flight path 102 after the source cell 106A.

Upon determining a target cell 106C, operation 1310 may initiate a handover of the UAV 104 from the source cell 106A to the target cell 106C. In one embodiment, operation 1310 may be performed via one or more of the sub-operations 1310A, 1310B, 1310C, and 1310D. At sub-operation 1310A, a handover request is transmitted to the target cell 106C, wherein the handover request includes a time value that indicates when the UAV 104 will be in a coverage area 108C of the target cell 106C and is based on the flight path 102. In one embodiment, a controller 316

(e.g., the MME 316E) may transmit the handover request to the target cell 106C at sub-operation 1310A.

At sub-operation 1310B, a timer may be set based on the time value of the handover request. In one embodiment, this timer is set by the target cell 106C and is used to determine when the UAV 104 is expected to reattach to the network 100 via the target cell 106C.

At sub-operation 1310C, data that is addressed to the UAV 104 may be cached until expiration of the timer. In one embodiment, the target cell 106C and/or a controller 316 (e.g., the MME 316E) may cache data for the UAV 104. The cached data may be data received by the target cell 106C or the controller 316 while the UAV 104 is not connected to the network 100.

At sub-operation 1310D, data transmissions may be spoofed on behalf of the UAV 104 for the duration of the timer. In one embodiment, the data transmissions include messages to keep links associated with the UAV 104 active. For example, to maintain a command and control link active, the target cell 106C may transmit keep alive messages on behalf of the UAV 104 (e.g., spoofing the address/origin of the messages) during the duration of the timer (e.g., while the UAV 104 lacks connectivity to the wireless network 100). In other embodiments, a controller 316 may perform spoofing at sub-operation 1310D.

After operation 1310, including one or more sub-operations 1310A-1310D, the method 1300 may either detect at operation 1312 that the UAV 104 has not connected to the target cell 106C before expiration of the timer or detect at operation 1316 that the UAV 104 has connected to the target cell 106C before expiration of the timer. Upon detecting that the UAV 104 has not connected to the target cell 106C before expiration of the timer, operation 1314 may transmit an indication that communication with the UAV 104 has been lost. In one embodiment, this indication may be transmitted from the target cell 106C to the controller 316 and/or from the controller 316 to the UTM system 300A. In one embodiment, the indication includes one or more of a last known location of the UAV 104 and a time of last communication with the UAV 104.

Upon detecting that the UAV 104 has connected to the target cell 106C before expiration of the timer, operation 1318 may transmit cached data to the UAV 104. This cached data may be directly transmitted to the UAV 104 from the target cell 106C or from the controller 316 (e.g., the MME 316E) to the UAV 104 via the target cell 106C.

As described above, the methods, systems, and devices discussed herein enable optimal network utilization during out of coverage handovers. Specifically, when the UAV 104 moves out of the coverage areas 108 of network cells 106 and consequently detaches from the network 100, IP-CAN session state information associated with the UAV 104 may be preserved and later utilized. In particular, since the movement pattern (e.g., flight path 102) of the UAV 104 is known in advance, the network 100 can predict when and where the UAV 104 will reattach to the network 100 and utilize this IP-CAN session state information for the target cell 106. In addition, this functionality enables automated alarms if the UAV 104 is missing after a time that the UAV 104 is predicted (based on a known flight path 102) to have connected with the target cell 106C. Using the techniques described herein (particularly for the multiple target cells 106 over the course of the same flight path 102 or different flight paths 102), the network 100 can learn how handovers are executed and use this learned information to further optimize out of coverage handovers for UAVs 104. Further, by caching data and/or spoofing messages on behalf of the UAV 104, legacy UAV 104 management protocols may function normally even when the UAV 104 is out of coverage.

Figure 14:
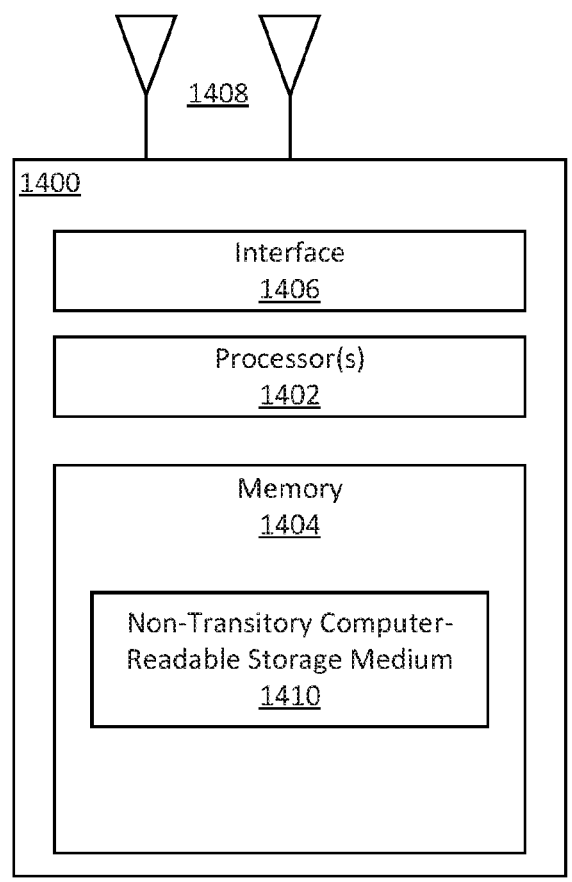
FIG. 14 illustrates a computing/networking device according to one embodiment.

Each element of the air traffic system 300 may be composed of or otherwise implemented by a set of computing/networking devices. For example, FIG. 14 illustrates a computing/networking device 1400 according to one embodiment. As shown the computing/networking device 1400 may include a processor 1402 communicatively coupled to a memory 1404 and an interface 1406. The processor 1402 may be a microprocessor, controller, microcontroller, central processing unit, digital signal processor, application specific integrated circuit, field programmable gate array, any other type of electronic circuitry, or any combination of one or more of the preceding. The processor 1402 may comprise one or more processor cores. In particular embodiments, some or all of the functionality described herein as being provided by a component of the air traffic system 300 may be implemented by one or more processors 1402 of one or more computing/networking devices 1400 executing software instructions, either alone or in conjunction with other computing/networking devices 1400 components, such as the memory 1404.

The memory 1404 may store code (which is composed of software instructions and which is sometimes referred to as computer program code or a computer program) and/or data using non-transitory machine-readable (e.g., computer-readable) media, such as a non-transitory computer-readable storage medium (e.g., magnetic disks, optical disks, solid state drives, read only memory (ROM), flash memory devices, phase change memory) and machine-readable transmission media (e.g., electrical, optical, radio, acoustical or other form of propagated signals—such as carrier waves, infrared signals). For instance, the memory 1404 may comprise non-volatile memory containing code to be executed by the processor 1402. Where the memory 1404 is non-volatile, the code and/or data stored therein can persist even when the computing/networking device 1400 is turned off (when power is removed). In some instances, while the computing/networking device 1400 is turned on, that part of the code that is to be executed by the processor(s) 1402 may be copied from non-volatile memory into volatile memory (e.g., dynamic random-access memory (DRAM), static random access memory (SRAM)) of the computing/networking device 1400.

The interface 1406 may be used in the wired and/or wireless communication of signaling and/or data to or from computing/networking device 1400. For example, interface 1406 may perform any formatting, coding, or translating to allow computing/networking device 1400 to send and receive data whether over a wired and/or a wireless connection. In some embodiments, the interface 1406 may comprise radio circuitry capable of receiving data from other devices in the network over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via the antennas 1408 to the appropriate recipient(s). In some embodiments, interface 1406 may comprise network interface controller(s) (NICs), also known as a network interface card, network adapter, local area network (LAN) adapter or physical network interface. The NIC(s) may facilitate in connecting the computing/networking device 1400 to other devices allowing them to communicate via wire through plugging in a cable to a physical port connected to a NIC. In particular embodiments, the processor 1402 may represent part of the interface 1406, and some or all of the functionality described as being provided by the interface 1406 may be provided in part or in whole by the processor 1402.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing a wireless connection of an Unmanned Aerial Vehicle (UAV), the method comprising:
   detecting, by a controller of a wireless network, a handover condition for the UAV within the wireless network, wherein the UAV is connected to a source cell in the wireless network when the handover condition is detected;
   determining, by the controller in response to detecting the handover condition, a target cell in the wireless network based on a flight path of the UAV; and
   initiating, by the controller, a handover of the UAV from the source cell to the target cell,
      wherein initiating the handover further comprises:
         spoofing data transmissions on behalf of the UAV for the duration of a timer,
         wherein the spoofed data transmissions include messages to keep links associated with the UAV active, and
         wherein the spoofed data transmissions include an address of the UAV to indicate that the spoofed data transmissions originated from the UAV instead of the controller.

2. The method of claim 1, wherein determining the target cell comprises:
   translating the flight path into identifiers of cells in a set of cells in the wireless network, wherein the set of cells are cells along the flight path; and
   selecting the target cell from the set of cells, wherein the target cell is the next cell along the flight path after the source cell.

3. The method of claim 1, wherein the wireless network is a 3rd Generation Partnership Project (3GPP) network and the source cell and the target cell are enhanced NodeBs.

4. The method of claim 1, wherein initiating the handover comprises:
   transmitting a handover request to the target cell, wherein the handover request includes a time value that indicates, based on the flight path, when the UAV will be in a coverage area of the target cell.

5. The method of claim 4, wherein initiating the handover further comprises:
   setting the timer based on the time value of the handover request; and
   caching data that is addressed to the UAV until expiration of the timer.

6. The method of claim 1, wherein one or more of the caching and the spoofing are performed by the target cell.

7. The method of claim 5, further comprising:
   detecting that the UAV has connected to the target cell before expiration of the timer; and
   transmitting, in response to detecting that the UAV has connected to the target cell before expiration of the timer, cached data to the UAV.

8. The method of claim 5, further comprising:
   detecting that the UAV has not connected to the target cell before expiration of the timer; and
   transmitting, in response to detecting that the UAV has not connected to the target cell before expiration of the timer, an indication that communication with the UAV has been lost.

9. The method of claim 8, wherein the indication includes one or more of a last known location of the UAV and a time of last communication with the UAV.

10. The method of claim 8, further comprising:
    receiving the flight path from a UAV traffic management system,
    wherein the UAV traffic management system manages an airspace traversed by the flight path and the UAV traffic management system approved the flight path, and
    wherein the indication that communication with the UAV has been lost is transmitted to the UAV traffic management system.

11. The method of claim 1, further comprising:
    receiving a set of signal quality measurements from the UAV; and
    detecting the handover condition when at least one of the signal quality measurements is below a threshold value.

12. A non-transitory computer-readable storage medium storing instructions which, when executed by a set of one or more processors of a computing device of a wireless network controller of a wireless network, cause the computing device to:
    detect a handover condition for the UAV within the wireless network, wherein the UAV is connected to a source cell in the wireless network when the handover condition is detected;
    determine, in response to detecting the handover condition, a target cell in the wireless network based on a flight path of the UAV; and
    initiate a handover of the UAV from the source cell to the target cell, wherein initiating the handover further comprises:
       spoofing data transmissions on behalf of the UAV for the duration of a timer,
       wherein the spoofed data transmissions include messages to keep links associated with the UAV active, and
       wherein the spoofed data transmissions include an address of the UAV to indicate that the spoofed data transmissions originated from the UAV instead of the controller.

13. The non-transitory computer-readable storage medium of claim 12, wherein determining the target cell comprises:
    translating the flight path into identifiers of cells in a set of cells in the wireless network, wherein the set of cells are cells along the flight path; and
    selecting the target cell from the set of cells, wherein the target cell is the next cell along the flight path after the source cell.

14. The non-transitory computer-readable storage medium of claim 12, wherein initiating the handover comprises:

transmitting a handover request to the target cell, wherein the handover request includes a time value that indicates, based on the flight path, when the UAV will be in a coverage area of the target cell;

setting the timer based on the time value of the handover request; and caching data that is addressed to the UAV until expiration of the timer.

15. A network device for managing a wireless connection of an Unmanned Aerial Vehicle (UAV), comprising:

a processor;

a memory coupled to the processor, wherein the memory includes one or more instructions that when executed by the processor cause the network device to:

detect a handover condition for the UAV within a wireless network, wherein the UAV is connected to a source cell in the wireless network when the handover condition is detected;

determine, in response to detecting the handover condition, a target cell in the wireless network based on a flight path of the UAV; and initiate a handover of the UAV from the source cell to the target cell, wherein initiating the handover further comprises:

spoofing data transmissions on behalf of the UAV for the duration of a timer, wherein the spoofed data transmissions include messages to keep links associated with the UAV active, and wherein the spoofed data transmissions include an address of the UAV to indicate that the spoofed data transmissions originated from the UAV instead of the controller.

16. The network device of claim 15, wherein determining the target cell comprises:

translating the flight path into identifiers of cells in a set of cells in the wireless network, wherein the set of cells are cells along the flight path; and selecting the target cell from the set of cells, wherein the target cell is the next cell along the flight path after the source cell.

17. The network device of claim 15, wherein initiating the handover comprises:

transmitting a handover request to the target cell, wherein the handover request includes a time value that indicates, based on the flight path, when the UAV will be in a coverage area of the target cell;

setting the timer based on the time value of the handover request; and caching data that is addressed to the UAV until expiration of the timer.

* * * * *